United States Patent
Nieto et al.

(10) Patent No.: US 12,131,283 B2
(45) Date of Patent: Oct. 29, 2024

(54) ACTIVATION ARCHITECTURE FOR PROCESSING DIGITAL ASSETS AND RELATED PHYSICAL PRODUCTS

(71) Applicant: adidas AG, Herzogenaurach (DE)

(72) Inventors: Andrea Nieto, Portland, OR (US); Carl Arnese, Portland, OR (US); Ryan Dangaran, Wilsonville, OR (US); Todd Ames, Portland, OR (US); Erika Wykes-Sneyd, Bubenreuth (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 17/944,847

(22) Filed: Sep. 14, 2022

(65) Prior Publication Data
US 2023/0110817 A1    Apr. 13, 2023

Related U.S. Application Data

(63) Continuation of application No. 17/499,460, filed on Oct. 12, 2021, now Pat. No. 11,487,850.

(51) Int. Cl.
*G06Q 10/083* (2024.01)
*G06F 16/27* (2019.01)
*G06F 21/10* (2013.01)

(52) U.S. Cl.
CPC ........... *G06Q 10/083* (2013.01); *G06F 16/27* (2019.01); *G06F 21/1015* (2023.08)

(58) Field of Classification Search
CPC .. G06F 21/10; G06F 16/27; G06F 2221/0713; G06Q 10/083
See application file for complete search history.

(56) References Cited

U.S. PATENT DOCUMENTS

| | | | |
|---|---|---|---|
| 11,032,072 B2 | 6/2021 | Andon et al. | |
| 11,189,131 B1* | 11/2021 | Weiksner | G06Q 20/4016 |
| 11,487,850 B1 | 11/2022 | Nieto et al. | |
| 11,501,370 B1* | 11/2022 | Paya | G06Q 20/3676 |
| 11,522,700 B1* | 12/2022 | Auerbach | H04L 9/3213 |
| 2018/0167198 A1* | 6/2018 | Muller | G06F 21/44 |

(Continued)

FOREIGN PATENT DOCUMENTS

| | | |
|---|---|---|
| JP | 2002-140492 A | 5/2002 |
| JP | 2021-086355 A | 6/2021 |

(Continued)

OTHER PUBLICATIONS

StockX, "What are Vault NFTs?," StockX Help Ceter, https://stockx.com/help/articles/What-are-Vault-NFTs, published Feb. 25, 2022.

*Primary Examiner* — Kristie D Shingles
(74) *Attorney, Agent, or Firm* — Sterne, Kessler, Goldstein & Fo P.L.L.C.

(57) ABSTRACT

Systems and method disclosed herein provide a digital asset system that interconnects the processing of digital assets and related physical products within an enterprise network. Digital assets may be generated and updated based on a number of factors including the interactions with the digital asset within the enterprise network and the physical and commercial attributes of the related physical products. Digital assets may be dynamically updated on real-world conditions and utilized to facilitate cross-system interaction between users, manufacturing, and user engagement systems.

20 Claims, 12 Drawing Sheets

(56) References Cited

U.S. PATENT DOCUMENTS

| | | |
|---|---|---|
| 2019/0109707 A1 | 4/2019 | Ajoy |
| 2020/0042989 A1 | 2/2020 | Ramadoss et al. |
| 2020/0184547 A1* | 6/2020 | Andon ............... G06Q 30/0643 |
| 2020/0186338 A1* | 6/2020 | Andon ................ G06F 16/2457 |
| 2020/0259666 A1 | 8/2020 | Jacobs et al. |
| 2020/0273048 A1* | 8/2020 | Andon ................. G06Q 20/045 |
| 2021/0248594 A1 | 8/2021 | Yantis et al. |
| 2021/0398095 A1* | 12/2021 | Mallett .................. G06Q 50/01 |
| 2022/0309491 A1* | 9/2022 | Shapiro .................... H04L 9/50 |

FOREIGN PATENT DOCUMENTS

| | | |
|---|---|---|
| JP | 6942872 B1 | 9/2021 |
| JP | 2022-514466 A | 2/2022 |
| WO | 2020106991 A1 | 5/2020 |

\* cited by examiner

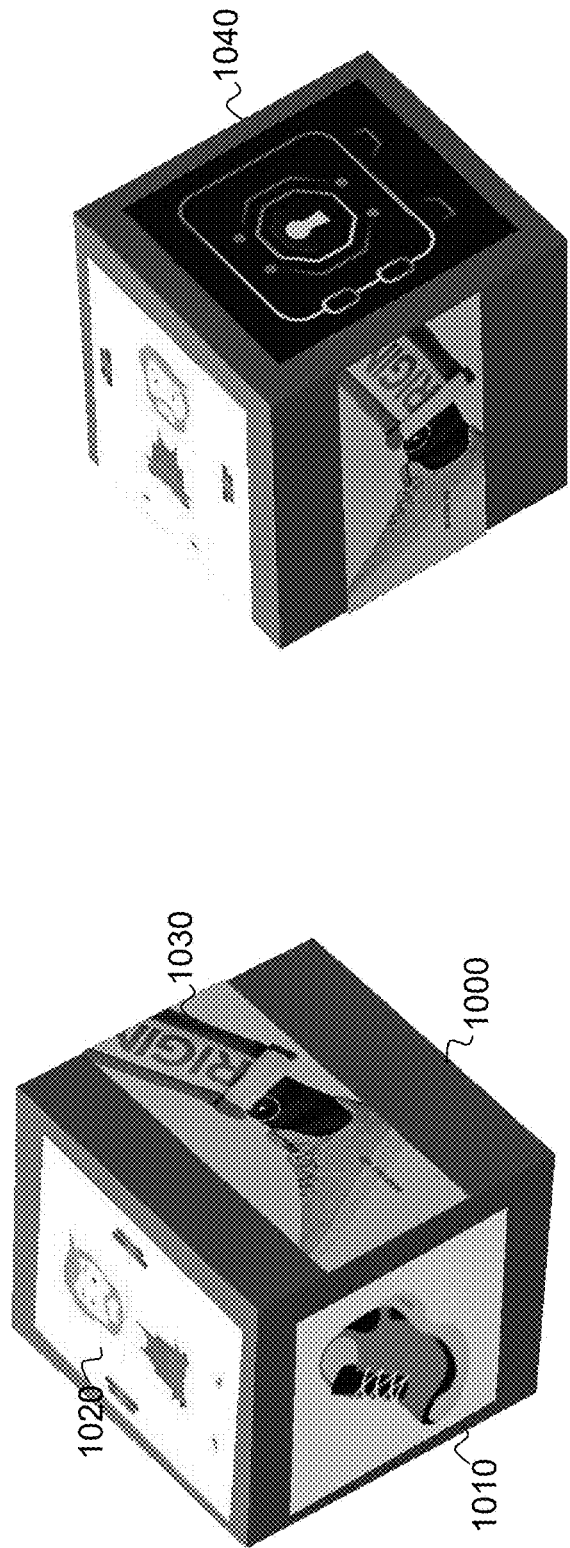
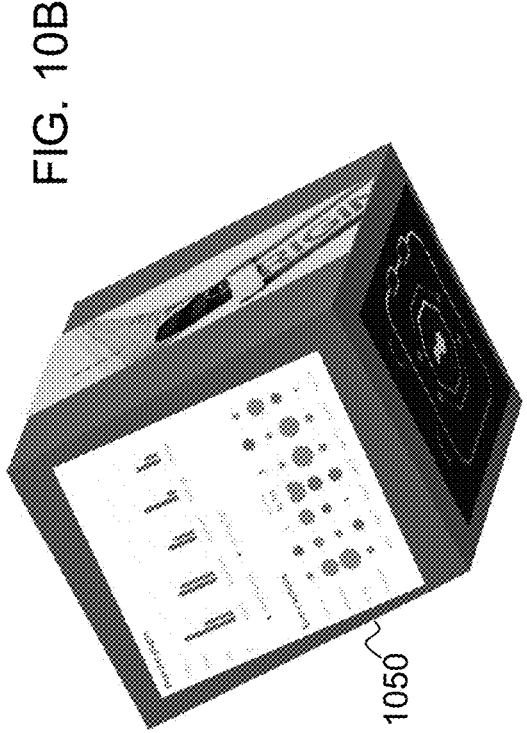
FIG. 10A
FIG. 10B
FIG. 10C

ACTIVATION ARCHITECTURE FOR PROCESSING DIGITAL ASSETS AND RELATED PHYSICAL PRODUCTS

CROSS-REFERENCE TO RELATED APPLICATIONS

This application is a continuation of U.S. patent application Ser. No. 17/499,460, filed Oct. 12, 2021, the entire contents of which is incorporated herein by reference.

FIELD OF THE INVENTION

Embodiments of the present invention generally relate to a novel architecture for securely interconnecting various systems including a digital asset system, a physical product system, and user activity across these systems. More particularly, embodiments of present invention relate to managing digital assets and corresponding physical products while facilitating cross-system interaction between user, manufacturing, and interactive user engagement systems using the digital assets.

BACKGROUND OF THE INVENTION

The digitization of physical products has been in full swing in recent years. Digital assets may be made available from companies through their various networking platforms including digital games, social media systems, membership/customer engagement programs, online stores, online financial systems, just to name a few examples. Generally, digital assets are a mechanism for these companies to expand the utility of physical products into the digital realm, which increases overall engagement with the products offered through a company's various platforms. For example, a digital asset associated with a physical product may be provided in the context of a video game. The digital asset could allow the physical product to be digitally recreated as a usable item in the video game. As another example, some of the digital assets may be created to increase loyalty of costumers to the services or products of the companies via a membership program.

Technologies such as distributed ledgers (e.g., Blockchain) have further transformed the digital asset landscape in two, intertwined ways: enabling the creation of digital assets as well as verifiable tracking ownership of those digital assets. However, existing features that utilize these digital assets have little practical value to customers outside of the particular associated service or product and beyond the asset itself. For example, current digital assets have little connection with real world objects and are static creations that are limited to what is provided by the company. A system that increases the value of digital assets beyond being merely a virtual symbol would be beneficial to companies to further increase user engagement and loyalty.

BRIEF SUMMARY OF THE INVENTION

According to some embodiments, a method, a system, and a non-transitory computer readable medium that includes operations for securely distributing a plurality of digital assets via a digital activation layer are claimed. The digital activation layer may comprise a distributed ledger for activating a digital wallet associated with a user device of a plurality of user devices in response to the user device connecting to the digital activation layer. In some embodiments, the distributed ledger is implemented as a blockchain network and includes an association between the digital wallet and the user device stored on a block in the blockchain network. The digital wallet may be associated with the user device.

The digital activation layer may receive a request for ownership of a digital asset of the plurality of digital assets from the user device. The distributed ledger may further store an association between the digital asset and a physical product on the block in a blockchain network. The digital activation layer may further store the digital asset (e.g., in a database or other storage means outside the digital activation layer) subsequent to receiving the request for ownership of the digital asset in the digital wallet.

Additional operations performed by the digital activation layer may further include receiving an action to be performed on the digital asset from the user device and performing the action on the digital asset. In some embodiments, the action is configured to cause a delay in or expedite initiating a second action associated with the physical product and the second action is to be performed by a backend layer in communication with the digital activation layer. In some embodiments, the backend layer may be implemented as a backend system controlled by an enterprise.

Further operations performed by the digital activation layer may include updating an ownership characteristic of the digital asset based on performing the action on the digital asset and transmitting, from the digital activation layer to the backend system, a signal configured to cause the backend system to initiate the second action associated with the physical product based on the ownership characteristic.

Additional features of embodiments of the invention will be set forth in the description that follows, and in part will be apparent from the description, or may be learned by practice of the invention. Both the foregoing general description and the following detailed description are exemplary and explanatory and are intended to provide further explanation of the invention as claimed.

BRIEF DESCRIPTION OF THE DRAWINGS

The accompanying drawings are incorporated herein and form a part of the specification.

FIGS. 10A-C are views of an exemplary digital asset, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
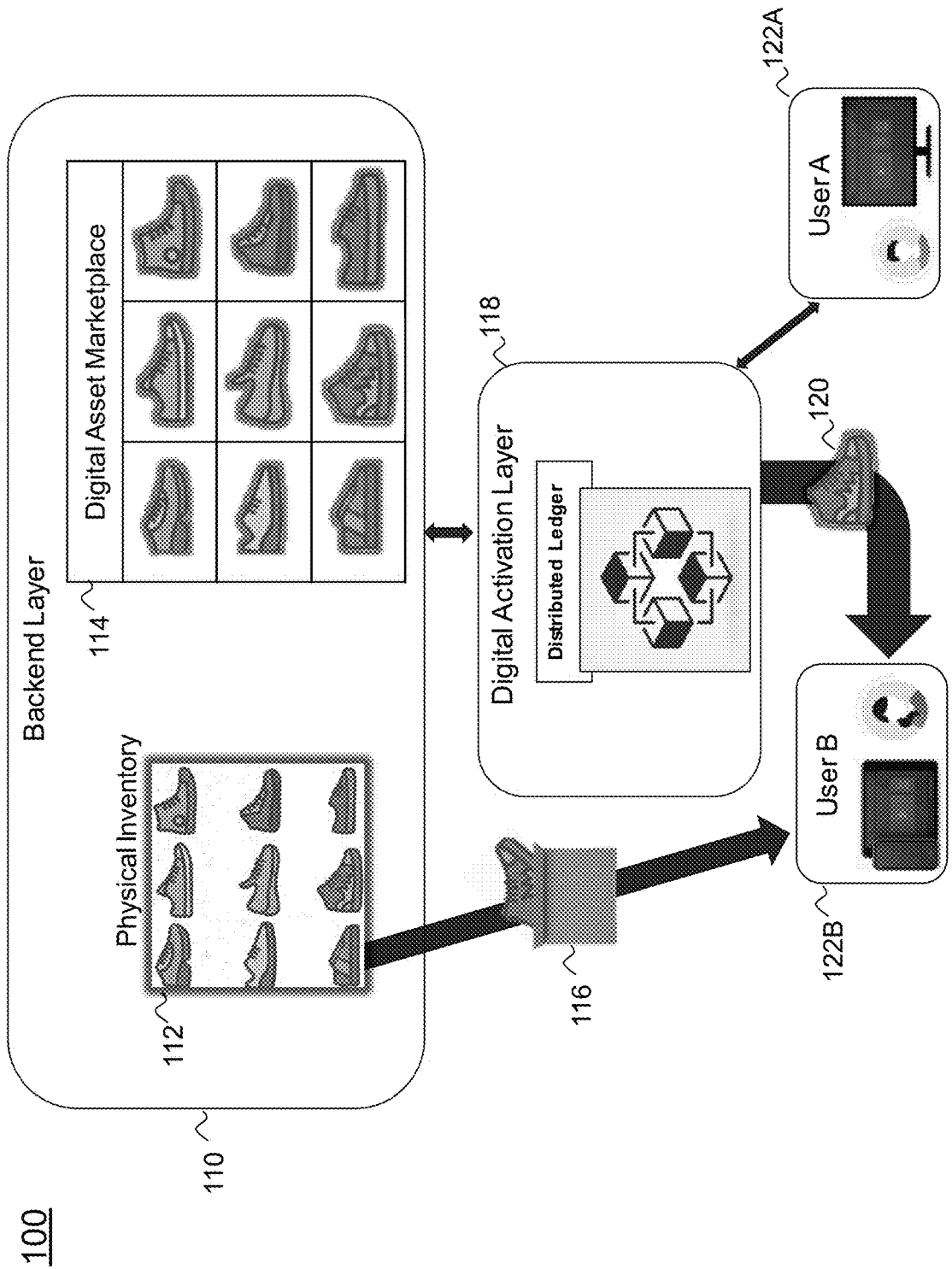
FIG. 1 is a block diagram of an activation architecture for processing digital and physical products, according to some embodiments.

The present invention will now be described in detail with reference to embodiments thereof as illustrated in the accompanying drawings. References to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

The term "invention" or "present invention" as used herein is a non-limiting term and is not intended to refer to any single embodiment of the particular invention but encompasses all possible embodiments as described in the application.

Various aspects of the present invention, or any parts or functions thereof, may be implemented using hardware, software, firmware, tangible computer readable or computer usable storage media having instructions stored thereon, or a combination thereof, and may be implemented in one or more computer systems or other processing systems.

The present disclosure is directed to an architecture for generating and processing digital assets and physical products. The architecture includes a digital activation layer that employs a distributed ledger that stores information about each user in a digital wallet in a secure manner and that allows for ownership of the digital assets to be traced in coordination with the ownership of the related physical products. A distributed ledger is a network construction that may be implemented as a distributed network of nodes, or a node system, that work together to maintain a synchronized immutable database. In some embodiments, the digital activation layer may be employed within an enterprise network of a company that provides both the physical products and generates the digital assets based on attributes of the physical products.

In some embodiments, the physical product may be, for example, an article of footwear or an article of clothing. Examples of articles of footwear include any type of shoe, a boot, or a sandal. Examples of articles of clothing include baseball caps, shirts, pants, shorts, and socks.

The distributed ledger component within the digital activation layer may be responsible for digital asset management within the enterprise network and with systems external to the enterprise network. For example, in some embodiments, the digital activation layer enables cross-system utilization of the digital assets across the company's systems including membership, ecommerce (e.g., purchasing, digital wallet management, marketplace), security (e.g., authentication, digital asset tracking), and physical product systems (e.g., production, shipping). In some embodiments, the digital activation layer may also connect to an external system, such as other service or product providers like video game providers, physical stores, and social media websites. At least some of the embodiments of the digital activation layer that employs the distributed ledger component satisfy the above needs and provide further related advantages as will be made apparent by the following description.

Some embodiments of the present invention relate to utilizing a digital activation layer for the creation and management of digital assets in combination with physical products. In an embodiment, the digital assets are guaranteed unique tokens (e.g., non-fungible tokens or NFTs). The physical products may correspond to physical counterparts of the digital assets. For example, the digital activation layer may generate the digital assets based on certain attributes of the physical products. In one embodiment, digital assets may be implemented as digital apparel that corresponds to one or more attributes of a physical wearable such as a shirt, a hat, or footwear. The distributed ledger in the digital activation layer may provide a marketplace where digital assets may be purchased. Users may also buy, sell, or trade the digital assets via the digital activation layer. The digital activation layer may process the physical product that corresponds to the digital asset based on actions performed on the digital asset. Examples of such processing include customizing the physical product, shipping the physical product to an owner (s) of the digital asset, and preventing the physical product from being shipped for a predetermined period of time.

Additional embodiments of the present invention also relate to utilizing the advantages of the distributed ledger component within the digital activation layer to increase user engagement with the company by expanding the utilization of the digital asset in both real-world and virtual settings. The distributed ledger enables secure tracking of user activity within the enterprise system as it relates to both digital and physical products and uses that information to customize additional services or products to encourage the user to return to the enterprise network. For example, new types of digital assets can be generated based on specific interactions by the user within the enterprise system such as with other users or through interacting with digital assets provided via the digital activation layer. As another example, user activity may involve interactions associated with a physical product that has been synced to the digital asset (e.g., taking steps while virtually wearing the digital apparel via a companion app on a mobile device), user activity involving the digital asset (e.g., social media activity promoting the digital asset to other users) or real-world activities (e.g., visiting a physical store, purchasing physical products). These additional services or products may require customization of a user's profile or generation of digital assets that are dropped into a digital wallet of the user and that can be used to grant certain privileges to the user such as promotional activities of physical products (e.g., earlier access, lower prices) or activities involving the digital asset (e.g., customization of digital assets, importation into third party applications).

Additional embodiments of the present invention may further relate to creation of a metaverse environment that connects both the enterprise network and any additional external systems and for enabling the integration of digital assets into the third-party systems. In an embodiment, external systems may include a product manufacturing system that is capable of converting the digital asset into a physical counterpart, one or more social media networks, one or more video games, and one or more networks associated with physical stores. In an embodiment, external systems may be implemented as a retail system that is capable of selling digital assets and/or selling physical counterparts to digital assets. In an embodiment, external systems may be implemented as an application server that provides access to third party applications such as video game system (e.g., Fortnight, Minecraft, World of Warcraft or Overwatch) or social media applications. The digital activation layer utilizes the distributed ledger to connect the digital asset to these separate systems. The benefits of the distributed ledger in this system allow for the verifiable and authenticated ownership of the digital asset to be shared between systems and ensures for a trusted transaction to occur between systems.

Therefore, the embodiments described herein allow for the creation and management of digital assets and corresponding physical products in a novel manner via the use of a distributed ledger that coordinates the storage and distribution of information associated with the digital assets, the corresponding physical products, and users, all of which may be implemented within the context of an enterprise system. That is, the digital activation layer utilizes the advantages of a distributed ledger to connect disparate systems both in and outside of an enterprise system in a secure manner as well as for the dynamic generation and coordination of new digital assets based on user activity that is stored across those systems.

Exemplary Digital Asset System

FIG. 1 is a block diagram illustrating an exemplary implementation of a digital asset system 100. In the exemplary implementation, the digital asset system 100 includes backend layer 110, digital activation layer 118, and user devices 122A and 122B. User devices 122A and 122B may correspond to different users of the digital asset system (e.g., different customers) and may be implemented as any one of a computing system, computing devices, laptop, desktop, mobile phone, tablet, software modules, database systems, virtual machines, wearables, appliances, Internet of Things (IoT) devices, group of multiple machines, etc., to name just some examples.

User devices 122A and 122B may communicate with backend layer 110 via digital activation layer 118. User devices 104 and 108, and backend layer 110 may connect to digital activation layer 118 through communication links that may be wired and/or wireless (or a combination thereof), and which may include any combination of LANs, WANs, cellular and satellite.

Backend layer 110 may include components (discussed in further detail in FIG. 2) for managing and providing user devices 122A and 122B access to a physical inventory 112 of physical products and digital asset marketplace 114 that provides users access to digital assets. For example, in managing user devices 122A, backend layer 110 may include servers for manufacturing physical products and shipping the physical products. Manufacturing servers may control production systems that produce the physical products. For example, the manufacturing systems connect to a production facility that produces footwear. Backend layer 110 may also be implemented with a processor to handle the calculations for receiving user requests for customizing physical products, purchasing physical products, customizing digital assets and purchasing digital assets. As another example, backend layer 110 may communicate with retail servers that may control retail systems including order placing and inventory management systems that manage or sell physical products. For example, the retail systems may be either an online or brick and mortar retailer that sells footwear.

Backend layer 110 may provide access to and manage physical products in the physical inventory 112 that may implemented as, for example, a website via that user devices 122A-B may interact to select, customize and/or purchase the physical products. Similarly, backend layer 110 may provide access to and manage digital assets in the digital asset marketplace 114, which may also be implemented as, for example, a website via that user devices 122A-B may interact to select, customize, and/or purchase the digital products. In an embodiment, backend layer 110 may provide a unified interface for connecting to both the physical inventory 112 and digital asset marketplace 114.

Digital activation layer 118 may connect backend layer 110 to user devices 122A-B via a distributed ledger component that facilitates communications using information stored in the distributed ledger. The information in the distributed ledger may be implemented as a blockchain network including a semi-private blockchain network or a private blockchain network. All blockchain networks, be it public, private, or semi-private as discussed further below, utilize some type of consensus protocol. In application, the protocol differs for each because of the different ways that each network handles users. Other shared characteristics of blockchain networks are that each node maintains a copy of a write-only ledger of transactions that take place in the network and use a consensus protocol to sync the copies.

But there are differences in these blockchain networks that provide different advantages to the digital activation layer 118. For example, a public blockchain network allows access to any user with no permissions (e.g., credentials) required. This allows for a greater number of users to participate in the network. A public blockchain network may use proof of work or proof of state as its consensus protocol to provide consensus on the information stored in the blockchain. To achieve consensus, each user (or node) in a public blockchain network may be required to solve a complex problem (i.e., proof of work) or may be required to "stake" their token as collateral for participation in the blockchain. When a node in the network provides the proof of work (e.g., solves a mathematical puzzle) or proof of stake, that node is allowed to confirm the recent block of transaction on the blockchain and broadcasts that block to all other nodes in the network for storing in their copy of the blockchain.

A private, or permissioned, blockchain network is typically a blockchain network that may be controlled by a single entity, such as a company, who determines who can participate within the blockchain, verify transactions, and who can view the information recorded on the blockchain. Users who wish to participate in a private network must first receive permission to join based on an access control mechanism implemented by the controlling entity. Examples of such mechanisms include allowing existing nodes to provide invitations or a dedicated consortium of nodes authorized to issue invitations. User actions within the network such as the types of transactions that the user can issue may also be restricted by rules implemented by the controlling entity. When implemented with a private blockchain network, the digital activation layer 118 is enabled to protect certain information (e.g., each user's credit card information) private and secure. Unlike public blockchain networks, which may provide robust application ecosystems due their unrestricted nature, private blockchain networks may be regulated in terms of how the private blockchain may be used and accessed. In addition, the entity controlling the private blockchain network may require users to provide identification information, assign privileges to users, and other features that more closely resemble enterprise applications. Due to their smaller user footprint, private blockchain networks may use different consensus protocols from public blockchain networks. For example, private blockchains may assign the responsibility to a dedicated group of nodes in the network to authorize transactions. Such a consensus allows faster approval of transactions.

A semi-private, or hybrid, blockchain network employs both a public blockchain network and a private blockchain network and allows an entity (such as a company) implementing a hybrid blockchain to leverage features from both that benefit the particular application being supported. For example, an entity can protect background transactions (e.g., such as purchases of physical and digital assets) between users and the entity while also sharing information about the assets to the users via the distributed ledger. In other words, the public blockchain network may be customer-facing while the private blockchain network may be used to process the transactions in a manner that is not viewable by the users of the public blockchain network.

When implemented with a semi-private blockchain network, the digital activation layer 118 may provide a customer-facing blockchain network and an enterprise-facing blockchain network. The customer-facing blockchain network may be for interacting with the backend layer 110 including accessing and purchasing physical products, accessing and purchasing digital assets, and verifying the ownership of both the physical and digital assets, to name a few examples. The enterprise-facing blockchain network may be for providing a backbone for processing transactions, storing information associated with the transactions and the users on the distributed ledger, and generating the digital assets, to name a few examples. In an embodiment, the digital activation layer 118 may implement the distributed ledger as a semi-private blockchain network.

In another embodiment, the distributed ledger may be implemented using a main blockchain and sidechains. Sidechains are blockchains separate from and run parallel to the main blockchain. Digital assets may be retrieved from the main blockchain, utilized in the sidechain, and then moved back to the main blockchain. For example, a digital asset may be generated or minted on a sidechain and moved to the main blockchain as needed. In some embodiments, a sidechain is connected to the main blockchain via a bidirectional link that allows the digital assets to be passed between the sidechain and the main blockchain. The sidechain may implement its own set of rules, functionalities, consensus algorithm, and for a purpose, all different from those of the main blockchain. A digital asset may be generated and implemented on the main blockchain for transactions. After the digital asset is available (e.g., after the transaction), the digital asset may be transferred to one or more connected sidechains where it may be processed according to the rules or policies of that sidechain. In an embodiment, the hybrid blockchain network may be implemented as a main public blockchain and separate private sidechains. There could be a separate sidechain for different functions implemented by the company. For example, digital activation layer 118 may implement a sidechain for processing digital asset transactions, a sidechain for processing membership transactions involving digital assets, a sidechain for processing the digital assets in external systems (e.g., a video game, social media), and a sidechain for processing transactions for processing physical product transactions related to the digital assets. Sidechains allow for more efficient processing of transactions and allow new features to be added to the main blockchain without interrupting functions of the main blockchain.

In some embodiments, regardless of how the distributed ledger (private, public, semi-private) is implemented, data in the distributed ledger may also be indexed to facilitate ownership identification. Digital activation layer 118 may index data in the distributed ledger to allow for data in the ledger to be more easily queried. In some embodiments, indexing data may comprise utilizing one or more interfaces that represent different portions of the data being stored in the distributed ledger. Queries for data on the distributed ledger may be processed by the respective interface that describes the queried data. That interface may then retrieve the queried data from the ledger, which may include more quickly identifying users of digital assets or particular moments associated with ownership of digital assets. In some embodiments, the interface includes a listing of the data for which it is responsible and exposed functions that define how to query the interface for data. Interfaces thereby allow data on the blockchain to be queried for efficiently. An example use of an interface is the ability to query a timeline for certain events of ownership of a digital asset. These "snapshot" moments of ownership may be retrieved via a query and may be utilized to further customize the digital asset and the user's interactions.

In some embodiments, the distributed ledger may also utilize additional methods for ensuring user privacy involved in transactions. As one example, the distributed ledger may be implemented with a zero-knowledge succinct non-interactive argument of knowledge or "zk-SNARK", which is a protocol that may be used to verify a statement as being true but without revealing any other information, such as that the amount of funds in a user account meets a monetary threshold for a transaction without revealing the exact amount in the user account. Accordingly, the distributed ledger may confirm that a user has sufficient funds to proceed with a transaction without the user having to provide the exact amount in his user account.

Generation of Digital Assets

Whichever type of distributed ledger is utilized for storage and management of the transaction and user information, digital activation layer 118 utilizes the information stored in the distributed ledger to provide trusted interactions between users of the distributed asset system 100 and across the different platforms of the enterprise including transactions involving the digital assets and physical products. As one example, a transaction may include the creation of digital assets based on real world physical counterparts (i.e., physical products). For example, digital activation layer 118 may create digital apparel, such as digital asset 120, based on a corresponding real world physical wearable such as physical product 116. Digital activation layer 118 may create the digital asset 120 based on physical or commercial attributes of the physical product 116. Non-limiting examples of physical attributes include the dimensions, colorways, and size of the physical product 116. As another non-limiting example, digital assets may include an image generated based on the physical attributes of the physical product.

Non-limiting examples of commercial attributes include the country of origin, the identification of the manufacturing facility, the manufacturing date, the shipping date, the shipping route from the manufacturing facility to the retailer, the number of corresponding physical products that were produced, the number of sales, the number of pre-orders, and the number of mentions (e.g., hashtags) detected on social media, and the use of the physical product in the real world (e.g., in a basketball game, the Olympics, by celebrities). It is important to note that although digital asset 120 may correspond in a one-to-one relationship with the physical product 116 (i.e., an NFT for a particular shoe owned by a customer), there may be several related physical products to physical product 116 (i.e., there may be 1,000 shoes manufactured for the particular model of shoe). Accordingly, the commercial attributes in this description refer to the related physical products and not just physical product 116.

Digital assets may be generated based on one or more of the commercial attributes based on an algorithm implemented by the distributed ledger. For example, certain commercial attributes such as the country of origin, the manufacturing facility identifier, the manufacturing date, the shipping date, and the shipping route, may be used in generating a digital asset that captures the provenance of the physical product 116. In another example, the digital asset may also represent the commercial use of the physical product such as the number of the manufacturing units of the physical product (i.e., the rarity), the number of sales, and/or the number of social media mentions.

In an embodiment, the digital activation layer 118 may create the digital asset 120 using one or more of the physical and commercial attributes discussed above based on a generation algorithm that takes in any of the selected physical and commercial attributes and outputs the digital asset 120, which may comprise one or more digital images that represent the physical product 116, provenance information of the physical product 116, and a running transaction log of the digital asset 120. The digital asset 120 along with all related information may be stored in a block on the blockchain network.

In some embodiments, the digital asset 120 is a non-fungible token ("NFT") that is a digital asset. The uniqueness of the digital asset is guaranteed because it is generated using the blockchain network. The NFT enables tokenization of the physical product and is secured by the blockchain network. In some embodiments, the NFT also tokenizes membership, such as data associated with rewards membership programs, purchasing membership programs, just to name a few examples. For physical products that have multiple manufacturing units (e.g., a shoe), there may be a unique NFT for each manufacturing unit and represents the unique commercial attributes of each physical product 116.

The characteristics of the digital asset as described above may be regulated by code on the blockchain network. Examples of the code include smart contracts (Ethereum network), which allows different operations on the digital asset such as issuing royalties or other payments and transactions. In one embodiment, the digital asset may be created using an NFT algorithm similar to the ERC-721 standard that is used within an Ethereum network.

Through these various means, the distributed ledger of the digital activation layer 118 not only tracks ownership of the digital asset 116 and physical product 120, but also links ownership of the digital asset 116 to ownership of the physical product 120 on a block on the blockchain. The digital asset 116 may therefore, in part, represent a tokenized ownership claim to the physical product 120 as well as other characteristics of the physical product 120 such as the physical and commercial attributes discussed above. There may be automated means on the distributed ledger for retrieving information about the digital asset 116 and physical product 120 from the different systems of the digital asset system 100 and consolidating the retrieved information in a block on the distributed ledger.

In some embodiments, using the commercial attributes as part of generating the digital asset 116 also enables dynamic updating of the digital asset 116. For example, certain commercial attributes change in real-time such as the number of sales of related physical products that include physical product 120, the number of pre-orders of related physical products that include physical product 120, and the number of mentions (e.g., hashtags) detected on social media of related physical products that include physical product 120, and the use of related physical products that include physical product 120 in the real world (e.g., in a basketball game, the Olympics, photographed on celebrities). Each time these attributes are updated (e.g., the number of social media mentions increases), the digital assets (including digital asset 116) associated with the related physical products (including physical product 120) may be updated to reflect the new attributes. In other embodiments, the properties of the digital asset 116 are fixed and cannot be updated.

Updating of digital assets allow the digital assets to reflect changes in the real-world and therefore increases the value and utility of the digital assets for the owner. Updating of digital assets in this manner also increases the rarity of each asset since they are being updated in real-time. In an embodiment, updating of the digital assets may be implemented using smart contracts stored on the blockchain of digital activation layer 118. In other words, the digital activation layer 118 collects real-world data such as the commercial attributes associated with the related physical products and delivers the data to blocks that store linked digital assets and utilize smart contracts on the those blocks to parse the data and update the digital assets.

In an embodiment, updating of digital assets includes changing one or more visual characteristics of the digital asset. In an embodiment, when first generated, the digital asset 120 may be a multi-dimensional (e.g., 2-d or 3-d) digital representation of the physical product 116. As the digital asset 120 is updated based on changes to the commercial attributes of related physical products, the visual characteristics of the digital representation may evolve to reflect those changes. For example, there may be a visual characteristic that represents the popularity of the shoe on social media platforms (e.g., a counter representing the number of mentions, images of the physical product being used by a celebrity or in a basketball game). The digital activation layer 118 may be configured to connect to specific sources for retrieving the commercial attributes including website aggregators and specific social media websites that enable the related physical products to be detected and their corresponding real-world data to be retrieved.

In other embodiments, the commercial attributes may unlock the visual characteristics. For example, a specific number of social media mentions may trigger a new color-way or a new logo for the digital asset. The digital activation layer 118 may implement a tiered scheme for locking visual characteristics behind commercial achievements by one or more of the owners of the related physical products, the owner of the specific physical product 116, or the commercial attributes discussed above with respect to sales of the related physical products and popularity of the related physical products. As one example, the digital activation layer 118 may retrieve social media activity of all owners of the related physical product (e.g., the same model shoe). This information may be retrieved dynamically through connections that the digital activation layer 118 has with external systems and also with information that is already stored in the distributed ledger associated with the digital asset owned by the owners. If the digital activation layer 118 determines that the total number of posts or other social media activity by the owners has reached a certain threshold, then digital activation layer 118 may unlock visual characteristics of the digital asset and update the digital assets for each of the users. As another example, the users may link their physical activity (e.g., a number of steps, heart rate) that is tracked via a personal fitness device (e.g., a smartwatch) in the physical product 116 to the visual characteristics of the digital asset. The greater the usage of the physical product 116 may result in a corresponding change in the digital representation in the digital asset (e.g., the digital representation may be updated to show wear and tear that reflects the use of the physical product 116).

In a further embodiment, the digital activation layer 118 may further connect to manufacturing or shipping facilities and manufacture a corresponding change to related physical products. For example, if the digital activation layer 118 unlocks a new colorway for the digital asset, the digital activation layer 118 may further send the colorway to the manufacturing facility for producing an update to the related physical products in the new colorway.

Digital Asset Marketplace

The digital activation layer 118 may further provide access to and manage the digital asset marketplace 114 where digital assets may be customized, purchased, or traded between users of digital asset system 100. For example, the digital activation layer 118 may provide a mechanism for digital assets to be purchased. In some embodiments, the digital assets may be purchased directly with digital currency (e.g., blockchain-based) or real-world currency (e.g. fiat money); in some embodiments, ownership of the digital assets may be linked to the physical product where purchase of the physical product may result in automatic ownership of the digital ownership or vice versa where purchase of the digital asset may result in automatic ownership of the physical product. The digital activation layer 118 may also provide a mechanism that allows digital assets to be sold or traded between users of the digital asset system 100.

The digital activation layer 118 also may coordinate distribution, via for example, a push or pull action from user devices 122A-B, of digital assets based on when physical products are released or purchased. In an embodiment, digital asset system 100 coordinates with manufacturing facilities that manufactures corresponding physical products to which digital assets are synchronized. In an embodiment, the commercial release or purchase of physical product 116 may result in associated digital assets being made available for sale or trade via the digital asset marketplace 114.

In an embodiment, the digital activation layer 118 also stores user profiles in corresponding blocks in the distributed ledger where each block may be associated with each user of digital asset system 100. The user profile may store any type of information associated with the user such as the owned physical products and digital assets, social media information, user activity within the digital asset system 100, and user activity external to the digital asset system 100. User profiles may be implemented as part of a social media network where users can customize the physical products and digital assets that are displayed to other users. In an embodiment, user profiles may be implemented as a virtual storefront where users, via their devices such as user devices 104 and 108, can buy, trade, or sell digital assets with other users. Digital assets include not only the virtual representation of a physical product—such as a virtual shoe and a physical shoe—but also the components of the digital assets when the digital assets are implemented as a combination of different assets. As one non-limiting example where a physical product is a shoe and a digital asset is a digital representation of the shoe, the digital asset may be implemented as a combination of components representing the shoe such as the sole, upper, tongue, eyelets, laces, material, shape, color, and style.

User Devices

In an embodiment, user devices 122A-B may each include a processor and a memory storage. User devices 122A-B may communicate with each other and digital activation layer 118 using a wired or wireless connection. For example, user device 122A may communicate with user device 122B through a cellular network or directly based on wireless protocols including Bluetooth, WiFi, any machine to machine (M2M) protocol or internet of things (IoT) protocol.

Figure 2A:
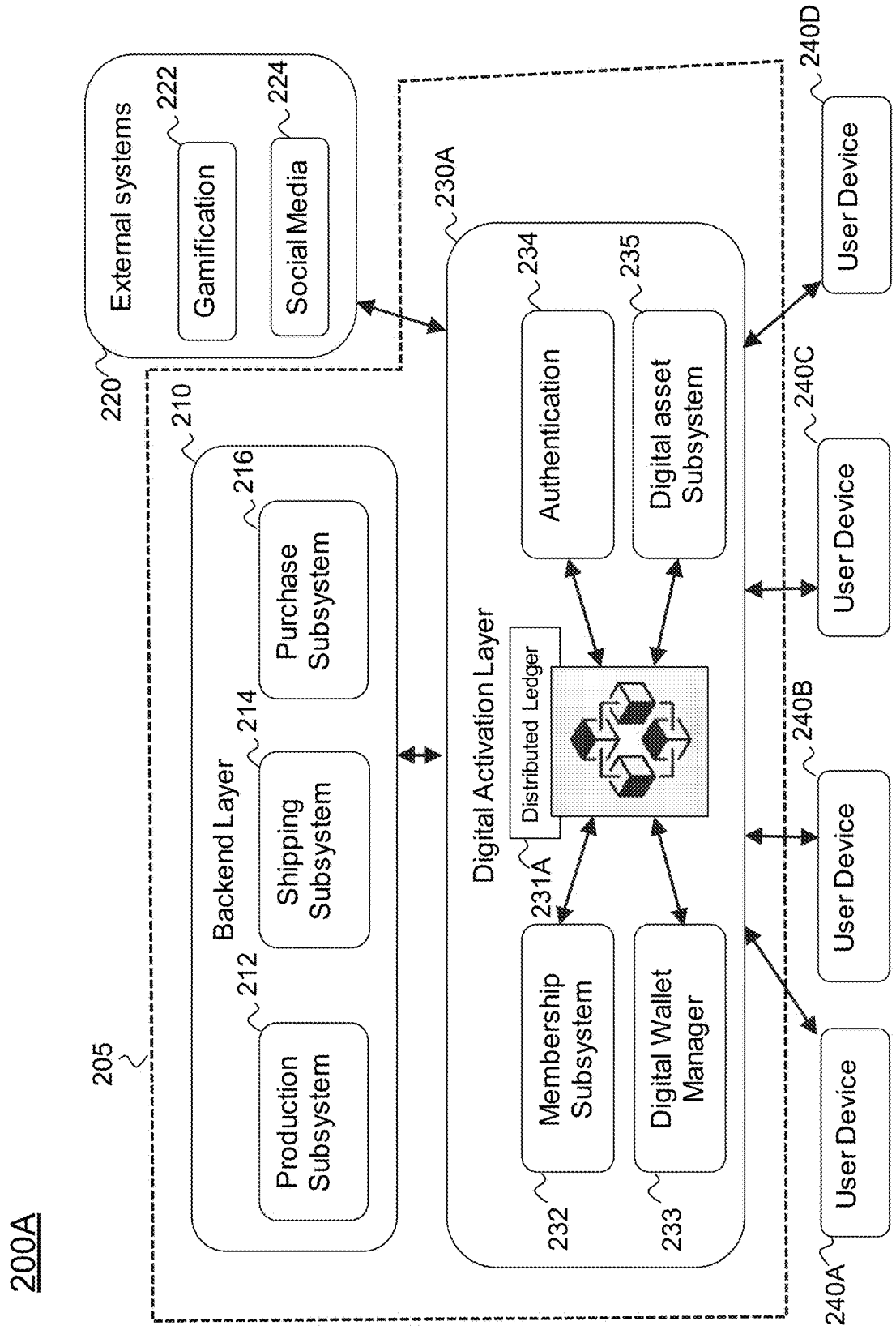
FIG. 2A is a block diagram of an activation architecture including various components for processing digital and physical products, according to some embodiments.

Each of user devices 122A-B may connect with physical product 116. The physical product 116 may be capable of transmitting wireless signals to the user devices 122A-B. For example, the physical product 116 may be installed with wireless chips based on Bluetooth, WiFi, and RFID; as another example, the physical product 116 may include an identifier (e.g., QR code) that can be scanned by user devices 122A-B that connects the user devices 122A-B to specific information stored in the digital activation layer 118. User devices 122A-B may also communicate directly with backend layer 110 such as through the receipt of shipping notifications when the physical product 116 is being shipped. T Exemplary Implementations of the Digital Activation Layer FIG. 2A is a block diagram of an activation architecture 200A including various components for processing digital and physical products, according to some embodiments.

Activation architecture 200A includes enterprise network 205, external systems 220, and any number of user devices including user devices 240A-D. In an embodiment, activation architecture 200A may represent a metaverse in which digital assets may be utilized both within enterprise network 205 and within external systems 220. Enterprise network 205 includes backend layer 210 and digital activation layer 230A.

In an embodiment, backend layer 210 may correspond to the backend layer 110 and therefore incorporates the related features and functions of the backend layer 110 described above. Backend layer 210 may further include production subsystem 212, shipping subsystem 214, and purchase subsystem 216.

Production subsystem 212 may include components for connecting to a manufacturing system for producing physical products. The digital activation layer 230A utilizes information stored in the distributed ledger 231A to provide a novel design-to-manufacturer process that is based on digital assets and user information. In an embodiment, production subsystem 212 may send signals to the manufacturing system to produce physical products based on one or more of the digital assets, the user's interactions with the digital assets, the commercial attributes of the physical products, and other user information.

Shipping subsystem 214 may include components for connecting to a shipping system for shipping physical products to users associated with user devices. Shipping subsystem may be configured to receive signals from the digital activation layer 230A for initiating shipping sequences associated with the physical product.

Purchase subsystem 216 may include components for facilitating and managing the purchase of digital and physical products. In some embodiments, purchase subsystem 216 may manage and provide access to the physical inventory 112 and digital asset marketplace 114. In an embodiment, purchase subsystem 216 may, in combination with the distributed ledger 231A, provide access to digital currency for use in the transactions involving the digital and physical products. Digital currency may be implemented using blockchain technology of the distributed ledger 231A including smart contracts and tokens. Implemented in the distributed ledger 231A, the smart contracts function as code that can be executed in a decentralized manner across different nodes in the distributed ledger 231A.

In an embodiment, the smart contracts in the distributed ledger 231A also include states that track the progress of the smart contract as it is being executed. Smart contracts may be automatically executed when requirements associated with the digital assets are met. As one non-limiting example, a smart contract is a contract between a shoe manufacturer and its customers. The shoe manufacturer may be responsible for deploying the distributed ledger and controlling which customers can access the distributed ledger. The smart contract can specify that certain products or services (e.g., digital asset, physical product, early access to digital assets or physical products) can be made available to a customer based on a certain condition when performed by the customer. Examples of these conditions include performing certain activities with the digital or physical product, such as posting about the physical product or reaching a milestone with respect to number of followers or posts, or activities based on their user devices such as checking in to a physical store during a promotional period.

In an embodiment, the digital activation layer 230A can distribute tokens to user devices based on execution of the smart contracts. Tokens may then be utilized within digital asset system 100 as payment for products or services within digital asset system 100. Tokens can be stored in the digital wallet of the user. As one example, tokens may be used to purchase digital or physical products via user devices 240A-D. In an embodiment, tokens may also be used at physical stores affiliated with token provider (e.g., shoe manufacturer) for purchase of physical products. In this embodiment, physical stores may interact with digital activation layer 230A to track and update user profiles based on the user actions within the physical stores.

In an embodiment, smart contracts in digital activation layer 230A may include adjustment factors in the smart contracts that adjust the number of tokens to be rewarded. These adjustment factors can be based on tiered thresholds associated with the conditions for executing the smart contract. For example, the number of tokens may be increased or decreased by certain percentages based on the tiers—four tokens for visiting three physical stores, five tokens for visiting four physical stores, and so on.

Smart contracts and tokens may also be utilized for remixing or customizing digital assets. Tokens may be required to generate a customized version of two or more digital assets through execution of a smart contract. The smart contract uses the two or more digital assets to create a new digital asset that may include various components of each of the two or more digital assets. In an embodiment, the smart contract provides code for retrieving certain components (e.g., colorways, style) from each digital asset and combining them to form the new digital asset. The new digital asset and details of the customization are stored in a blockchain in the distributed ledger 231A. The smart contract can include the specific components in each digital asset and specify how components interact with each other when combined into a digital asset. For example, in an embodiment involving implementing digital assets as digital shoes, a smart contract may specify that certain types of eyelets are to be integrated in different ways based on the overall style of the shoe (such as high-tops, boots, mid-rise, low-tops). The smart contract may specify that high-top shoes are to include a certain number of eyelets while boots are to include another number of eyelets such that when the smart contract is executed by the digital activation layer 230A, a digital asset corresponding to a high-top shoe is generated having different number of eyelets then a digital asset of a boot. In this manner, smart contracts may include information that dictate the appearance of digital assets based on the specific combination of different components. Smart contracts and utilization of blockchain can enable the digital activation layer 230A to validate uniqueness of each generated digital asset.

In an embodiment where digital assets are generated based on components from other digital assets, the methodology for combining the components may be based on a separate smart contract that defines the specific steps for which components are selected from each component, how they are combined, and other elements to be considered when forming the unique digital asset. In an embodiment, to amplify the uniqueness of each generated digital asset, the smart contract may specify additional elements in addition to the digital asset components to be used as part of generating each digital asset. Examples of these additional elements include information specific to the user such as the user's shoe size, the user's physical characteristics (e.g., provided from the user), any tracked information available to the digital activation layer 230A, such as the user's purchase information, user's geolocation history, or user's actual usage of certain physical products (e.g., walking data, physical activity data), and commercial attributes of the physical product including social media information such as trends or other usage metrics indicating a popularity score by a community of users.

In an embodiment, each generated digital asset is associated with its own smart contract that specifies the appearance, components, and other elements that are part of the digital asset. Because the smart contract and its associated information are stored in a blockchain, the digital activation layer 230A can validate the uniqueness of each digital asset and also provide a secure way for the digital assets be transferred between users. In an embodiment, digital activation layer 230A may communicate generated digital assets to production subsystem 212 for producing a corresponding physical product. Smart contracts in digital activation layer 230A may provide the conditions for when the generated digital assets are communicated to the production subsystem 212. For example, a particular user may have a heightened membership status that grants him privileges such as access to the production subsystem 212 which can produce the corresponding physical product. Membership status may be linked to a user's activity within the enterprise such as the amount of digital assets that the user has interacted with (e.g., purchased, created, burned, traded, etc.), social media activity, and other actions involving digital assets. The user's digital wallet, which records this activity, may be used as a digital passport or "VIP" card for the user to gain access to components of the enterprise, such as production subsystem 212.

In an embodiment, children digital assets may be generated from a single digital asset (i.e., not requiring two separate digital assets). Metadata of a digital asset may be used to generate another digital asset that is based on one or more attributes of the parent. For example, digital activation layer 230A may utilize a digital asset with a particular pattern or color to generate a related digital asset with the same pattern or color but in a different style of product. For example, the digital asset may be associated with a shoe but children digital assets may be another type of apparel such as a shirt, hat, or a backpack, but having the one or more of the same physical characteristics of the digital asset.

In an embodiment, digital activation layer 230A may correspond to the digital activation layer 118 and therefore incorporate the related features and functions of the digital activation layer 118 described above. Digital activation layer 230A may further include distributed ledger 231A, membership subsystem 232, digital wallet manager 233, authentication module 234, and marketplace subsystem 235.

Distributed ledger 231A may be implemented as a blockchain network that stores data collected and processed by enterprise network 205 on a blockchain. The distributed ledger 231A may leverage a number of features of a blockchain in order to perform the processing of the digital and physical products described herein. For example, the distributed ledger 231A may utilize smart contracts that automatically trigger specific actions based on different interactions with the digital assets. One type of smart contract may allow a percentage of sales of the digital asset to be provided to the company whenever the digital asset is transferred between users of the company's enterprise network 205. The use of smart contracts for tracking and maintaining actions associated with digital assets allows the entire process to be automated. In an embodiment where the digital assets are deployed within a rewards membership plan for the company, use of smart contracts enables the rewards membership plan to be automated without the need for the company or user to track points, issue rewards cards, or other conventional mechanisms currently used in current rewards programs. In such embodiments, information associated with each reward member may be tokenized and stored on the blockchain. Actions associated with a membership profile, such as redeeming rewards and points accrual, may be automated via the smart contracts stored on the blockchain.

The distributed ledger 231A may facilitate secure connections between the enterprise network 205, which includes legacy systems such as backend layer 210, to external systems 220 as well as other users. For example, the distributed ledger may utilize a main blockchain/sidechain structure for storing and processing the digital assets. Sidechains allow processes to occur separate from the main blockchain which has several advantages including reducing processing load on the main blockchain and testing new features or functions in a sidechain before they are implemented on the main blockchain. Sidechains allow for digital assets to be transferred from the main blockchain for use in other systems, such as from enterprise network 205 to the external systems 220.

Membership subsystem 232 may include components for managing functions associated with membership programs in the enterprise network 205. In some embodiments, membership subsystem 232 can track user interactions across an enterprise ecosystem. For example, an enterprise may consist of brick and mortar (i.e., physical) stores, a digital marketplace for NFTs, a digital marketplace for physical products, and cross-enterprise partnerships with other enterprises. Examples of interactions include purchases at the physical and digital stores, social media interactions, and actions performed at other partnered enterprises. Membership subsystem 232 may automatically update a user's membership or loyalty profile based on the user's actions across all these platforms (e.g., updating points) thereby reducing the friction for redemption and managing loyalty programs.

Membership subsystem 232 may also be used as part of authenticating users within the system and identifying potential bot activity. For example, the digital activation layer 230A may require a threshold number of interactions in order to determine whether a user is an actual person or a bot. Membership subsystem 232 may track each members interactions within the system, such as digital asset purchases, trades, burning, or any other activity with the digital activation layer 230A. Once a threshold level of activity is tracked by membership subsystem 232, digital activation layer 230A may provide the user access to backend layer 210 where it may then interact with the subsystems for producing physical products. This access may include enabling commands to be transmitted to backend layer 210 for facilitating or delaying the production of the physical products by production subsystem 212.

The digital activation layer 230A may also track user activity in external systems 220 such as in gamification component 222 and social media 224. Digital activation layer 230A may require a threshold amount of activity by a user in external systems 220 before being granted additional access to additional services such as backend layer 210 and production subsystem 212.

Digital wallet manager 233 may include components for managing the digital wallets associated with each user. In some embodiments, digital wallet manager may generate and/or manage a digital wallet for each user that tracks a user's actions across all platforms connected to the digital activation layer 230A. In some embodiments, digital wallet manager 233 exposes the digital wallet of users to digital activation layer 230A including user information that may be used to track user interactions or make decisions about a user's access to services provided by the digital activation layer 230A. The digital wallet may store any available user information resulting from transactions that take place on the blockchain. In some embodiments, a digital wallet may be considered a digital storage component that includes a central interface for managing multiple different payment instruments that may be considered an instrument that facilitates the transfer of money or monetary value. There may be different classes of payment instruments include credit cards and Blockchain-based currency. Implemented as a digital storage component, a digital wallet allows for different storing information related to each of the different payment instruments such that a user may access and utilize each payment instrument by interacting with the interface provided by the digital wallet. In some embodiments, a digital wallet may be authorized by the enterprise managing the digital activation layer 230A and provides management privileges to each user that is provided access to the digital activation layer 230A.

Authentication module 234 may include components for authenticating users for joining and signing into the distributed ledger 231A as well as securing wallets associated with each user. In some embodiments, authentication module 234 may connect to an external authentication provider such as a provider that provides two-factor authentication in order to authenticate users.

Digital asset subsystem 235 may include components for managing and customizing digital assets. As one example of digital asset management, digital asset subsystem 235 may record information regarding the ownership and usage of the digital assets. For example, digital assets may be sold and resold by multiple users, the digital asset subsystem 235 may record names of the current and all past owners of the digital assets. Additional information such as geolocation histories of the corresponding physical product may also be tracked and stored. Digital asset system 100 can store geolocations of physical products provided by user devices such as user devices 240A-D which may send usage notifications for the physical product.

In an embodiment, digital asset subsystem 235 enables customization of digital assets. For example, digital assets, which may be implemented as representative of physical products, can be customized based on physical and commercial attributes of the physical product. Customization may be provided via the combined functionality of the digital asset subsystem 235 and the distributed ledger 231A, the latter of which may retrieve the physical and commercial attributes stored on the distributed ledger 231A and/or retrieved in real-time from other sources. The digital asset subsystem 235 provides access to the interactions available to the user. In an embodiment, interactions, such as customizations of digital assets, access to different components of the digital assets, and access to the marketplace for buying, trading, and selling components, may be gated behind certain user activities, which when performed by users, unlocks the interactions and makes them available to the users. As one non-limiting example, the user activities may include purchasing of physical products and purchasing of physical products within a certain period of release of the physical products.

The digital asset subsystem 235 may track user activity and location history such as using the application installed on user devices, such as user devices 240A-D, as a basis for accessing digital assets. Examples of tracked activity include tracking a user device's check-in at an opening event of an apparel store, certain purchases (such as a threshold number of purchases), tracking the user's activity within digital asset system 100 for reaching certain milestones such as buying and trading a certain number of digital assets, reaching a certain user level, or any other measurable or trackable activity correlating the user with usage of digital assets.

An exemplary discussion of this customization mode of the application for modifying digital assets is now provided. In an embodiment, digital asset subsystem 235 may receive a request for generating or remixing a new digital asset based on two or more digital assets. Remixing may include combining components of the two or more digital assets to create a new combination of the components to form the new digital asset. Digital asset subsystem 235 may perform the combination randomly, based on user preference, based on popularity of the components (where the popularity is based on any metric measuring usage of the component by users), based on inputs or preferences from an external system such as a manufacturing facility (where the inputs and preferences may be from designers of the apparel company), or a retail server (where the inputs and preferences may be from retailer and/or their customers). In an embodiment, digital asset subsystem 235 may implement these mechanisms as various remixing modes that are selectable via the application. For example, random combination may be implemented as a random remixing mode where the digital asset subsystem 235 system may select random digital asset components from either of the two digital assets to form a new digital asset. As another example, digital asset subsystem 235 may provide a popularity remixing mode which results in selecting digital asset components based on popularity. The popularity of the digital asset component may be determined by a number of social media mentions, a number of purchases of the physical product, and/or a market price of the digital asset component.

In an embodiment, new digital assets may be generated (e.g., for a digital asset drop) using artificial intelligence (AI) such as machine learning algorithms that cross-references metrics associated with physical products to generate digital assets that are customized based on real-world sales and usage. For example, digital asset subsystem 235 may have access, via the distributed ledger 231A, to metrics such as sales figures or social media presence of physical products. Digital asset subsystem 235 may train a model based on the metrics to identify physical products and/or their specific components (e.g., sole, upper, tongue, eyelet, style, colors) based on popularity and to identify components that share similarity to identified popular components. In one embodiment, the trained model may be used to determine certain values for the specific components which reflects the attribution of each component to the popularity of the physical product. In some embodiments, this determination is based on game theory analysis intended to calculate how certain factors contribute to an overall result. In the embodiment, when digital assets are implemented as digital shoes and physical products include physical shoes, each component— e.g., tongue, eyelets, laces, colors, style, sole, design marks—are analyzed by the trained model which may assign a value to each component based on usage metrics associated with the physical product. The model can assess more popular shoes (based on sales and/or mentions on social media platforms) to determine whether respective components for each of those shoes have contributed to the popularity. For example, the model may determine that more popular shoes share common components such as design marks or specific style and calculate a specific value for each of the components. These attribution values may be used to rank the importance of the components which may subsequently be utilized when determining which components are to be provided as part of generating new digital assets. In some embodiments, the trained model can retrieve information available on the blockchain across different sources within the enterprise, such as production subsystem 212 (which may track production metrics), shipping subsystem 214 (which may track shipping metrics), and purchase subsystem 216 (which may track user metrics) to identify digital assets based on popularity and to be used in generating new digital assets.

Values may also be calculated for digital components of digital assets that reflect the popularity of the digital asset and/or may be extended to reflect its popularity with respect to any physical products. For example, the trained machine learning model may be used to track the popularity of a physical product in combination with the popularity and/or usage of the corresponding digital asset through the digital asset system. The trained machine learning model may then correlate, based on past tracking data from other physical products and digital assets, the popularity of the digital asset with the physical product to determine whether the digital asset contributed to sales of the physical product. For example, the trained machine learning model may correlate usage (such as activity and/or social media activity) associated with the digital assets with usage (such as sales data or social media activity) of the physical product. The trained machine learning model may then assign an attribution value to the digital asset based on the particular attributes of the digital asset. The attribution value may be used to rank the importance of the digital asset. Attribution values for digital assets may be calculated using the trained machine learning model that can be updated continuously based on the physical and commercial attributes of the physical product, and activity of the digital assets within the digital asset system 100.

In an embodiment, the scarcity (or rarity) of the digital assets can be tied to the attribution values. Specifically, digital assets are distributed via digital asset system 100 through any variety of channels such as directly to each user device, promotional activities tied to physical products, or via scheduled events or digital asset drops. Scarcity can refer to the chances of each digital asset being distributed to via these channels and/or the number of digital assets to be generated. Accordingly, some digital assets can be rarer than others thereby increasing their value within the digital asset system 100. Attribution values may be used in determining the chances for distributing the digital assets. For example, digital asset system 100 may reduce the distribution chance of digital assets or components whose attribution values indicate they are more popular to maintain the popularity of the components.

The digital asset subsystem 235 may also work in combination with purchase subsystem 216 to provide access to a digital asset marketplace (e.g., digital asset marketplace 114). In an embodiment, the digital asset marketplace may allow digital asset to be exchanged between users through interactions to communicate or share digital assets with each other via their respective user devices. In an embodiment, digital asset subsystem 235 may provide a common view of available digital assets to all users. In another embodiment, the trained machine learning model may adjust views of the available digital asset for each user based on the user's usage activity (e.g., purchases, past asset customizations, marketplace activity selling or trading assets).

Digital asset subsystem 235 may also serve as a mechanism for users to display collections of their digital assets that can be viewed and accessed by other users. The mechanism can allow for digital assets and components to be purchased (if made available for sale) or voted on by other users of digital asset system 100. The views or votes for the digital assets can be used by the trained machine learning model for calculating the popularity for each of the digital assets. Other interactions with the digital assets and components may be linked to the votes. For example, digital asset components having more than a predetermined number of views or votes can be bought, sold, and traded via the marketplace. As another example, an initial price of the user created digital asset components may depend on number of views or votes received.

External systems 220 includes gamification component 222 and social media component 224. Gamification component 222 may connect to external video game systems for utilizing digital assets. The digital activation layer 230A may connect to gamification component 222 and provide information via the distributed ledger 231A. Through this connection, the digital activation layer 230A may import digital assets into a video game being played by the owner of the digital assets and that are provided by gamification component 222. As one example, digital assets for a user may be implemented as digital apparel which can be utilized in adjusting the appearance and performance of digital avatars within the video game. In games where a player is represented by an avatar, digital assets may be used to adjust the capabilities of the player within the video game by changing the various statistics of the player. For example, an avatar may be associated with certain statistics such as strength, speed, or accuracy, and certain digital assets may either increase or decrease those statistics. When a digital asset is implemented as a digital shoe, the digital asset may have certain speed characteristics that when imported to a digital avatar would increase the speed of the digital avatar within the video game. Other examples of improvements provided by the digital asset include enabling the characters to receive boosts and hence jump higher, move fast, receive continuous healing, block a certain amount of damage, or deal an increased amount of damage. Gamification component 222 may also include a burn requirement where digital assets may be staked or offered as collateral within a game in exchange for participating in the game or receiving an additional reward. A trigger condition, such as loss within the game, may trigger the digital asset to be burned, or sent to a burn address. This requirement increases scarcity of the digital assets.

Staking or offering a digital asset as collateral is not limited to gamification component 222. For example, digital activation layer 230A may require digital assets to be staked in order to communicate with backend layer 210 as part of, for example, requesting physical products to be produced by production subsystem 212 and physical products to be shipped by shipping subsystem 214. Digital activation layer 230A may the release the staked digital asset after completion of the transaction.

The use of distributed ledger 231A for connecting the enterprise network 205 and external systems 220 provides advantages over conventional systems. The distributed ledger 231A may leverage sidechains and smart contracts to establish connections with the external systems 220 and for providing attributes of the digital asset to the gamification component 222 for implementation within the video game. The distributed ledger 231A may utilize a sidechain that is implemented specifically for interacting with the gamification component 222 that reduces the processing load of the main blockchain, and that can allow for a separate security mechanism that is agreed upon by the enterprise network 205 and the gamification component 222. This allows the sidechain to implement a connection that may be different from the main blockchain. If there are multiple gamification components which have different security requirements for connecting to their video games, this also allows the distributed ledger 231A to utilize sidechains having different security mechanisms to each of the gamification components.

In an embodiment, the characteristics of the digital asset may be specified in a smart contact implemented within digital asset system 100. Each digital asset may be unique within digital asset system 100 and its appearance and characteristics can be stored in a blockchain via the smart contract. When implemented in this manner, each digital asset and its characteristics can be validated as unique and owned by a particular user.

Social media component 224 may connect to external social media websites. In an embodiment, social media component 224 can connect to a third-party system such as a third-party social media provider. Digital assets and tokens provided within digital asset system 100 can be imported to third-party applications via external systems 220. Synchronizing the digital assets and tokens with applications provider expands the utility of these features beyond utilization within digital asset system 100. Social media component 224 may establish a two-way connection to enterprise network 205 via the distributed ledger 231A. Social media component 224 may provide information regarding digital assets for storing in the distributed ledger 231A. For example social media component 224 may utilize text or image recognition to identify social media posts that reference physical products and determining whether the identified physical products are associated with any digital assets. Social media component 224 may further include features for generating metrics for identified physical products such as tracking the number of social media posts and generating a timeline of social media posts.

In an embodiment, digital asset system 100 may convert the digital assets into other digital items for integration within the third-party application. For example, in third party video games, the digital asset may be converted to items that can be used in the video game. In other applications, such as social media applications that include images of the user, the digital assets may be used to digitally modify the images to include the digital assets. For example, images that include the user may be modified such that the digital asset is provided as an overlay in image, such as a digital shoe or apparel being worn by the user in the image.

Other embodiments of external systems 220 which are not shown may include a retail store system or a membership system. In an embodiment, the digital activation layer 230A may connect with a third-party online store of a different company. The digital activation layer 230A may convert digital assets into a discount code that can be used at the third-party online store. For example, the digital activation layer 230A may send a request that includes the digital asset or token to external systems 220 and the server may return a discount code in the form of a digital sequence or bar code that can be input into the online store during the time of a purchase of a physical product that is associated with the digital asset.

In an embodiment, digital assets may also be utilized as conditions for access to physical products sold in a physical store. As one non-limiting example, the digital activation layer may connect to a retail server associated with a physical store and may provide a user access to a physical product such as a particular shoe (e.g., Yeezy Boost 700 V1 Carbon Blue) that is available at the physical store. In other words, access to the physical product can be gated based on digital assets which can be used as conditions for access to the physical product or for allowing earlier access to the physical product, such as through earlier opportunities to purchase the shoe or an earlier opportunity to enter the physical store. As one example, users with certain digital assets such as the digital version of the physical product or users with a certain threshold number of tokens may have increased opportunities to purchase the physical product or earlier access. An application installed on user devices 240A-D may receive an instruction from the digital activation layer 230A to generate a unique bar code based on the digital assets or tokens of the user.

Figure 2B:
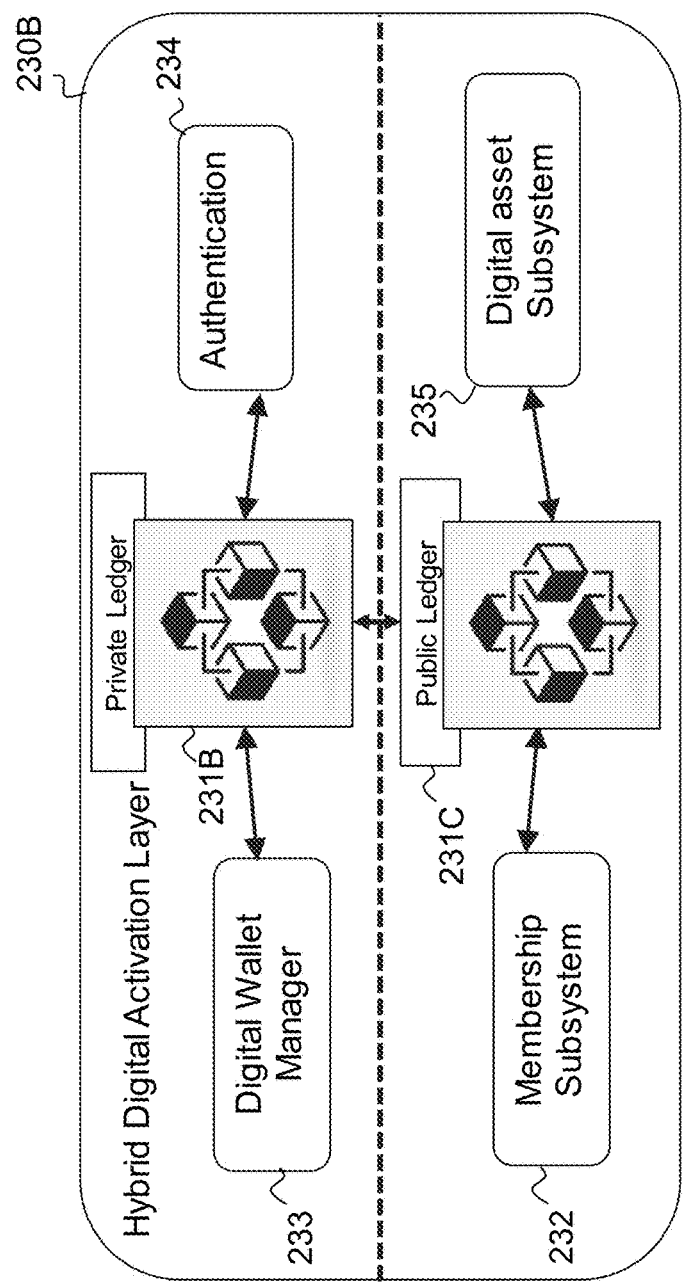
FIG. 2B is block diagram of an alternative embodiment of a digital activation layer including various components for processing digital and physical products, according to some embodiments.

FIG. 2B is block diagram of an alternative embodiment of the digital activation layer 230A, according to some embodiments. This alternative embodiment may be represented by digital activation layer 230B implemented as a semi-private or hybrid blockchain network which includes a private ledger 231B and a public ledger 231C. The private ledger 231B may be responsible for performing functions, such as performing transactions, in a manner that cannot be viewed by users of the enterprise network 205. A hybrid blockchain network is particularly beneficial for an enterprise network 205 where a company desires to keep certain operations to be managed by the company while providing a customer-facing (public) blockchain that is accessible to users of the enterprise network 205.

When implemented as a semi-private blockchain network, the digital activation layer 230B may gate access by, for example, issuing invitations or requiring sign-up to the enterprise network 205. The company may utilize the digital activation layer 230B to validate any users who wish to sign-up and perform transactions in the enterprise network 205. The company may establish permissions for each user which enforces restrictions on the transactions that users may perform within the enterprise network 205.

In some embodiments, certain components may be configured to perform operations with one or both of the private ledger 231B and the public ledger 231C based on the level of security required by the enterprise network 205. For example, digital wallet manager 233 may be configured to communicate only with the private ledger 231B because all transactions involving a digital wallet should be inaccessible to any users of the enterprise network. Similarly, authentication module 234 may also be configured to only communicate with the private ledger 231B. In contrast, membership subsystem 232 and digital asset subsystem 235 may be configured to communicate with public ledger 231C to perform operations that are accessible to users such as accessing their user information (via the membership subsystem 232) and their digital assets (via the digital asset subsystem 235).

It should be noted that the digital activation layer 230B is not limited to the particular configuration shown in FIG. 2B. It should be understood that the components may be configured to connect to the private ledger 231B and public ledger 231C in different configurations in a manner consistent with the goals of processing secure and customer-facing transactions described herein.

However the membership subsystem 232, digital wallet manager 233, authentication module 234, and digital asset subsystem 235 are configured to connect to the private ledger 231B and the public ledger 231C, in most embodiments, the private ledger 231B may communicate with the public ledger 231C. As one example of communication between these ledgers, the private ledger 231B and public ledger 231C may implement parallel and separate blockchains. In an embodiment, the private ledger 231B may implement a main blockchain, and the public ledger 231C may implement a sidechain, or vice versa. The implementation of a main blockchain and sidechains is discussed in further detail above. In the context of the private ledger 231B and public ledger 231C, the main blockchain may be used for processing customer-facing transactions and one or more sidechains may be implemented to process protected transactions or operations that should not be accessible for viewing by any users.

Exemplary Methods for Processing Digital and Physical Products

Figure 3:
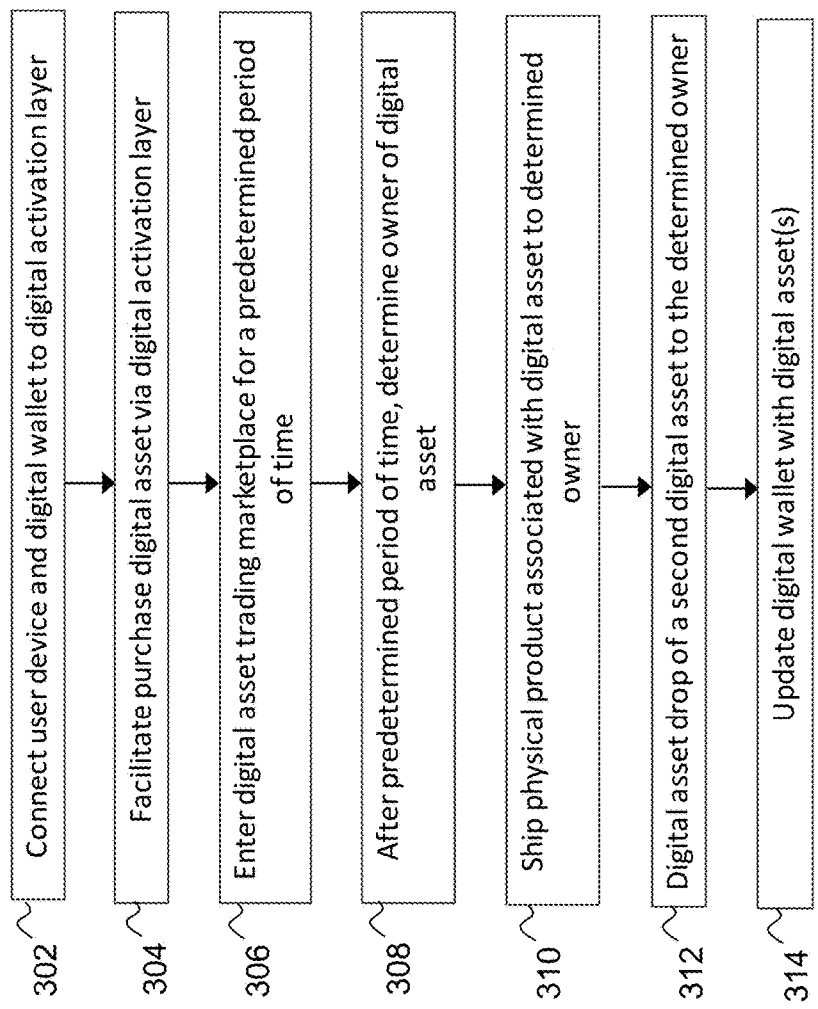
FIG. 3 is a flowchart illustrating steps for processing digital assets in combination with a physical product, according to some embodiments.

FIG. 3 is a flowchart illustrating a method 300 of processing digital and physical products. As a non-limiting example with regards to FIGS. 1 and 2A-B, one or more processes described with respect to FIG. 3 may be performed by a user device (e.g., user devices 240A-D of FIG. 2), a digital activation layer (e.g., digital activation layer 230A of FIG. 2), or a backend layer (e.g., backend layer 210 of FIG. 2). In such an embodiment, any of these components may execute code in memory to perform certain steps of method 300 of FIG. 3. While method 300 of FIG. 3 will be discussed below as being performed by digital activation layer 230A and user devices 240A-D, other devices may store the code and therefore may execute method 300 by directly executing the code. Accordingly, the following discussion of method 300 will refer to devices of FIG. 2 as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 302, the digital activation layer 230A may connect a user device to a digital wallet on the distributed ledger 231A. In an embodiment, this step may further include the distributed activation layer 230A activating a digital wallet associated with a user device 240A in a block of the distributed ledger 231A. The user device 240A may be one of a plurality of user devices 240A-D managed by the activation architecture 200A. When the digital activation layer 230 connects the user device 240A to a digital wallet in the distributed ledger 231A, the distributed ledger 231A includes an association between the digital wallet and the user device.

In 304, the digital activation layer 230A facilitates the purchase of a digital asset by the user device 240A. For example, the digital activation layer 230A may receive a request from user device 240A to purchase a digital asset of a group of digital assets being offered for sale via digital asset subsystem 235. The digital activation layer 230A may update a block in the distributed ledger 231A to identify an association between the digital asset and a physical product the corresponds to the digital asset. For example, the physical product may be a real-world representation of the digital asset. Purchasing of the digital asset may also result in storing the digital asset in the digital wallet.

In an embodiment, each digital asset in the group of digital assets is associated with the physical product. For example, there may be a one-to-one relationship between the number of digital assets and the number of manufacturing units for that physical product. The number of digital assets to be generated for a physical product may be determined using a rarity attribute associated with the physical product by the backend layer 210. The rarity attribute may be determined based on any commercial attributes of the physical product such as the number of manufacturing units, a predefined value established by the digital activation layer 230A, or the popularity of the physical product. The digital activation layer 230A may determine a number of the plurality of digital assets to be generated based on the rarity attribute and then may generate the plurality of digital assets based on the determined number. The rarity attribute may be based on a physical characteristic of a corresponding physical product such as the rarity of a color, colorway, fabric, or design. In some embodiments, production subsystem 212 may track metrics of all produced products including their physical characteristics and provide the tracked production metrics to the digital activation layer 230A.

In 306, the digital asset may enter a trading period within the digital asset marketplace for a predetermined period of time. When the digital asset enters the trading period, the digital activation layer 230a enables certain predefined actions to be performed on the digital asset. Actions include at least one of transferring the digital asset to another user device, digitally destroying the digital asset, and digitally holding the digital asset. Transferring the digital asset involves a transaction where ownership of the digital asset is transferred from one user (at one user device, e.g., 240A) to another user (at another user device, e.g., 240B). Digitally destroying the digital asset involves preventing the digital asset from being used in the future. The digital asset cannot be removed from the digital ledger due to the nature of the underlying blockchain protocol. Instead, digitally destroying the digital asset involves transferring the digital asset to a private one-way address in the digital ledger which prevents the digital address from being transferred out. The process cannot be reversed and once transferred, the transaction is submitted to all nodes in the digital ledger to record that the digital destruction of the digital asset has taken place.

Digitally holding the digital asset means that ownership of the digital asset is maintained with the current user and any further actions are prevented from being performed on the digital asset including any actions associated with the physical product associated with the digital asset. For example, holding the digital asset may entail sending a signal from the digital activation layer 230A to the backend layer 210 to prevent or expedite the production or shipment of the physical product to the owner. In some embodiments, the time duration for preventing the production or shipment may be configured automatically, such as by some property of the digital asset, or manually, such as via user input. In other words, the digital activation layer 230A may transmit a signal configured to cause the backend layer 210 to cause a delay (i.e., prevent) in initiating the second action (e.g., production or shipment) associated with the physical product. This second action is typically performed by a backend system in communication with the digital activation layer. The action may also include expediting the production or shipping of the physical product which shortens an existing time duration in which the physical product was to be produced or shipped. For example, the physical product may initially be scheduled to be produced or shipped in the next two months. An expediting action may result in shortening that time period by a certain time period such as one month.

The actions may be submitted from the user device 240A as well as other user devices in the plurality of user devices 240A-D. Accordingly, while the digital asset is entered in the trading period, the digital activation layer 230A may receive a request to perform any of the actions from one or more user devices. After the predetermined time period, the digital activation layer may perform the requested action on the digital asset and further actions are prevented from being performed on the digital asset.

In 308, the digital activation layer 230A may determine the owner of the digital asset after the predetermined period of time has lapsed. In an embodiment, the digital activation layer 230A may update an ownership characteristic of the digital asset based on performing the requested action on the digital asset. The ownership characteristic may be updated on the block associated with the digital asset in the digital ledger. For example, if the requested action was to transfer the digital asset to another user, the digital activation layer 230A may update the ownership characteristic of the digital asset to reflect the transfer. In one embodiment, updating the ownership characteristic based on transferring the digital asset to a second user device comprises transferring the digital asset from the digital wallet to another digital wallet associated with the second user device. Similarly, if the requested action was to digitally hold the digital asset, the digital activation layer 230A may confirm that the ownership characteristic accurately reflects the current owner.

In 310, the digital activation layer 230A transmits a signal to the backend layer 210. The signal may be configured to cause the backend layer 210 to initiate the second action associated with the physical product based on the ownership characteristic. For example, the second action may be to produce the physical product or to ship the physical product and the digital activation layer 230A will perform the requested second action based on the current owner of the digital asset. In some embodiments, the ownership characteristic identifies a physical address and the second action associated with the physical product comprises initiating a shipping sequence for delivering the physical product to the physical address. The shipping sequence may be initiated by a shipping subsystem 214 in the backend layer 210.

In 312, the digital activation layer 230A may perform another digital asset drop of a second digital asset to the determined owner of the digital asset. In some embodiments, this digital asset drop may be part of a membership or rewards service initiated to engage with owners of digital assets. The digital asset drop may involve generating new digital assets that may be related to or associated with the digital assets currently owned by the determined owner. For example, if the original digital asset is a shoe model with a first type of colorway, the digital activation layer 230, via digital asset subsystem 235, may generate a second digital asset for the shoe model but with an entirely unique colorway that is specific to the user, the commercial attributes of the shoe, or some other factor. In some embodiments, the assets that are part of the digital asset drop are customized for each user (rather than being a randomized set of digital assets). As one non-limiting example, a digital asset may be customized based on one or more attributes of the user, the user's device, and the physical assets owned by the user. Examples of user attributes include membership level, membership age, geographical location. Membership information includes the user's activities and interactions with the enterprise such as whether the user is part of a rewards program (and if so, the user's status level within the program) and the user's purchase history. Examples of user device attributes include the type of user device and geographic history of the user device. Examples of physical asset attributes include attributes about one or more physical assets owned by the user (not just the physical attribute associated with the digital asset) and physical characteristics of the physical attribute.

In an embodiment, the digital asset drop includes identifying a second user device of that owns a second digital asset in the group of digital assets. For example, the second user device may be associated with another version of the physical product (e.g., purchased by a user of the second user device). The digital activation layer 230A may deposit a third digital asset into the digital wallet associated with the user device and a fourth digital asset into a second digital wallet associated with the second user device. These additional digital assets may be generated in relation to the digital asset and the second digital asset owned by the first and second user device, respectively.

In 314, the digital activation layer 230A may update the digital wallet associated with the determined owner by indicating ownership of the digital asset and the second digital asset in the digital wallet. In some embodiments, this update may entail updating a block in the digital ledger 231A associated with the ownership of the digital asset. The digital ledger 231A ensures that ownership of the digital asset may be traced for all owners of the digital asset.

Figure 4:
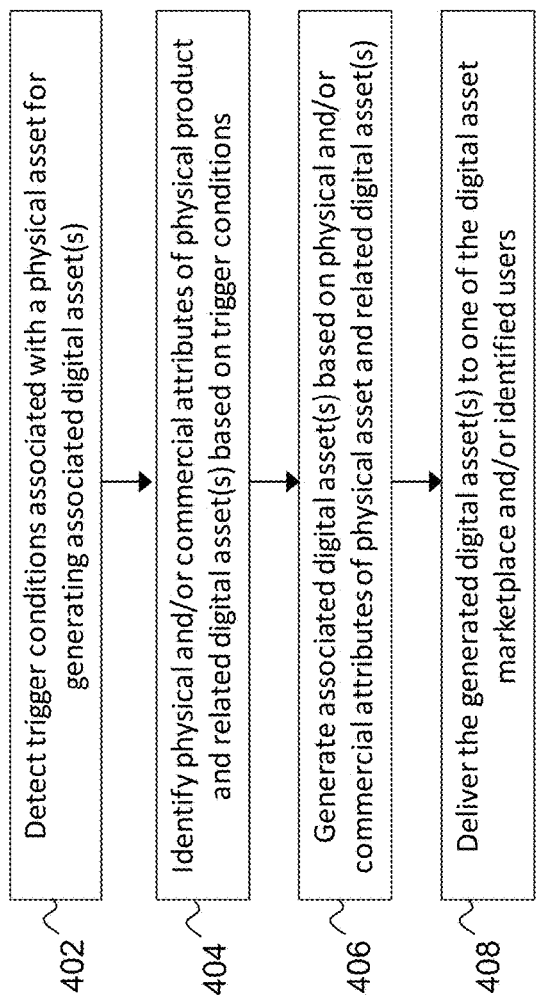
FIG. 4 is a flowchart illustrating steps for generating digital assets, according to some embodiments.

FIG. 4 is a flowchart illustrating a method 400 for generating digital assets, according to some embodiments. As a non-limiting example with regards to FIGS. 1 and 2A-B, one or more processes described with respect to FIG. 4 may be performed by a user device (e.g., user devices 240A-D of FIG. 2), a digital activation layer (e.g., digital activation layer 230A of FIG. 2), or a backend layer (e.g., backend layer 210 of FIG. 2). In such an embodiment, any of these components may execute code in memory to perform certain steps of method 400 of FIG. 4. While method 400 of FIG. 4 will be discussed below as being performed by digital activation layer 230A and user devices 240A-D, other devices may store the code and therefore may execute method 400 by directly executing the code. Accordingly, the following discussion of method 400 will refer to devices of FIG. 2 as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 402, the digital activation layer 230A may detect one or more trigger conditions associated with a physical product. The trigger conditions may be associated with generating digital assets in relation to the physical product. Examples of trigger conditions include a scheduled time to perform a digital asset drop to certain users in the enterprise network 205, a request from one or more users to customize or generate new digital assets, and detected conditions associated with the physical product such as manufacturing conditions (e.g., when the physical product is manufactured, when a certain number of manufacturing units of the physical product have been manufactured) and commercial conditions (e.g., number of sales).

In 404, the digital activation layer 230A may then identify physical and/or commercial attributes of the physical product and related digital asset(s) based on the detected trigger conditions. Physical and/or commercial attributes were discussed in additional detail herein. The detected trigger conditions may identify the physical and/or commercial attributes that are to be considered when generating the digital asset. For example, when the trigger condition is a scheduled digital asset drop, the trigger condition may further specify the related digital assets that are to form the basis of the new digital asset, the physical attributes associated with a physical product that are owned by the users who are scheduled to receive the digital asset drop, just to name a few examples. This may also include determining a number of digital assets to be generated; this number may be based on a desired rarity of the digital asset.

In 406, the digital activation layer 230A may generate the digital asset based on the identified physical and/or commercial attributes of the physical product and related digital asset(s). This may involve generating the one or more digital assets based on the identified attributes of the physical product and related digital asset(s). The operations for generating the digital asset are discussed in additional detail herein, for example, in relation to digital asset subsystem 235.

In 408, the digital activation layer 230A may then deliver the one or more generated digital assets to the desired location which may be one or more of the digital asset marketplaces or to one or more users as part of a rewards program with the enterprise network 205.

Figure 5:
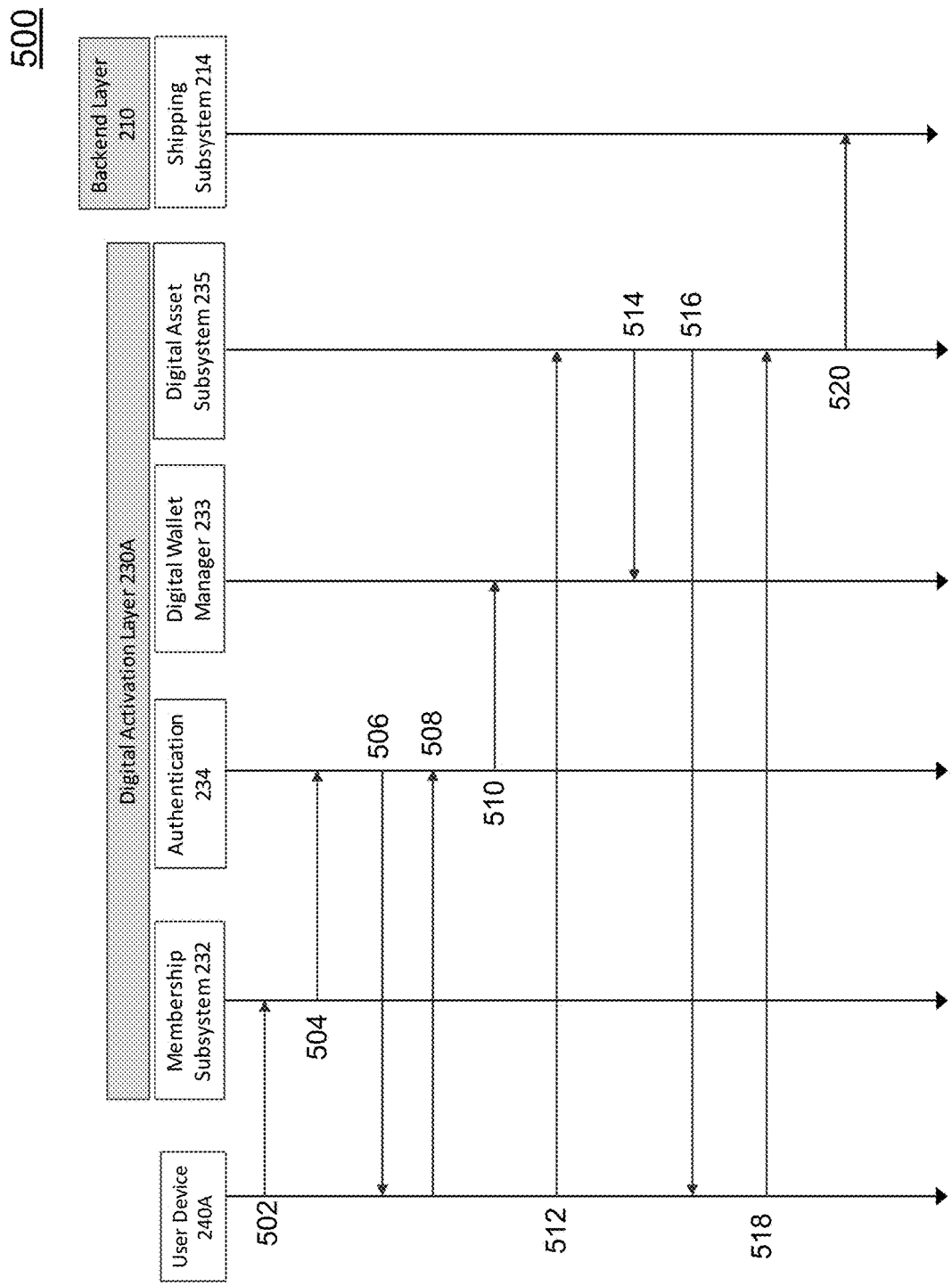
FIG. 5 is a system diagram illustrating communication between different devices within the system for processing digital assets in combination with a physical product, according to some embodiments.

FIG. 5 is a system diagram illustrating communication between different devices within the system for processing digital assets in combination with a physical product. Components are discussed in relation to FIG. 2A but are not limited to this embodiment. It should be noted that the communications illustrated in FIG. 5 merely represent one possible embodiment of the interactions between the identified components. It should be understood that other implementations of communications and other components may be involved with the process for the purpose of processing digital assets in combination with a physical product consistent with the description in this disclosure.

In 502, user device 240A may submit a request to join enterprise network 205 via the digital activation layer 230A. The request may be received by membership subsystem 232.

This request may comprise user information such as a username, password, and other information which may be utilized by the digital activation layer 230A to validate the identity of the user operating user device 240A. In some embodiments, the request may include a private information (such as a blockchain address, unique private and/or public key that is associated with the user) that is known only to the user. The request along with the private information may be encrypted using a public key provided by the membership subsystem 232.

In 504, membership subsystem 232 may provide the user information in the request to authentication module 234 for validation of the user. If the request is encrypted, the membership subsystem 232 may first decrypt the request using its own private key that corresponds to the public key that was used to encrypt the request. This step is different from conventional authentication steps because authentication module 234 may utilize sidechains that operate in parallel to a main blockchain. After decryption, the membership subsystem 232 may provide the user's private information to the authentication module 234 which may then add private information from the enterprise (e.g., a hash, random string, a timestamp) to create a new bundle.

In 506, the authentication module 234 may return the bundle to user device 240A. In some embodiments, the authentication module 234 may encrypt the bundle using a public key of the user (which may have been included in the request or that may otherwise be known to the enterprise network 205).

In 508, user device 240A may process the bundle and retrieve the information provided by the authentication module 234 to complete the registration process. If the bundle is encrypted using the user's public key, the user device 240A may decrypt the bundle using a private key that is associated with the user's public key. The user device 240A may digitally sign the bundle using another private key that is associated with the blockchain network and return the signed bundle to the authentication module 234.

In 510, the authentication module 234 validates the user for registration in the enterprise network 205 by verifying that the digital signature is authentic. If the digital signature is not authentic, the authentication module 234 ends the process which prevents the user from registering with the enterprise network. If the digital signature is authentic, registration is completed with the authentication module 234 communicating with the digital wallet manager 233 to establish a digital wallet for the user for use in the enterprise network 205. In some embodiments, this may also include establishing permissions for operations that the user device 240A is capable of performing within the enterprise network 205. As previously discussed, establishing permissions for each user may be performed using smart contracts in the distributed ledger 231A.

In 512, if registration has completed, user device 240A may be provided access to digital asset subsystem 235 and allowed to perform granted operations such as purchasing digital assets and purchasing corresponding physical products.

In 514, after receiving a requested operation from the user device 240A, the digital asset subsystem 235 may communicate with digital wallet manager 233 to confirm that the user device 240A has enough funds or permissions to perform the operation. For example, if the user device 240A is requesting to purchase a digital asset, then the digital asset subsystem 235 may confirm with the digital wallet manager 233 that the user device 240A has sufficient funds to purchase the digital asset.

In 516, digital asset subsystem 235 may communicate with user device 240A whether the operation is permitted to proceed. In an embodiment, the communication may include a notification that the digital asset has been deposited into the digital wallet associated with the user device 240A and ownership of the digital asset by the user device 240A is confirmed.

In 518, user device 240A may request additional operations that are now permissioned based on ownership of the digital asset such as transferring ownership of the digital asset to another user device (e.g., via a sale), digitally destroying owned digital assets, digitally holding digital assets, or requesting shipment of the physical product associated with the digital asset.

In 520, digital asset subsystem 235 may communicate with shipping subsystem 214 in backend layer 210 to perform additional operations based on any requested operations from the user device 240A. For example, if the user device 240A has requested digitally holding the digital asset, digital asset subsystem 235 may communicate a signal to the shipping subsystem 214 to prevent the shipment of any corresponding physical product. Conversely, if the user device 240A has requested shipment, then digital asset subsystem 235 may communicate another signal to the shipping subsystem 214 to initiate a shipping sequence of the corresponding physical product.

Figure 6:
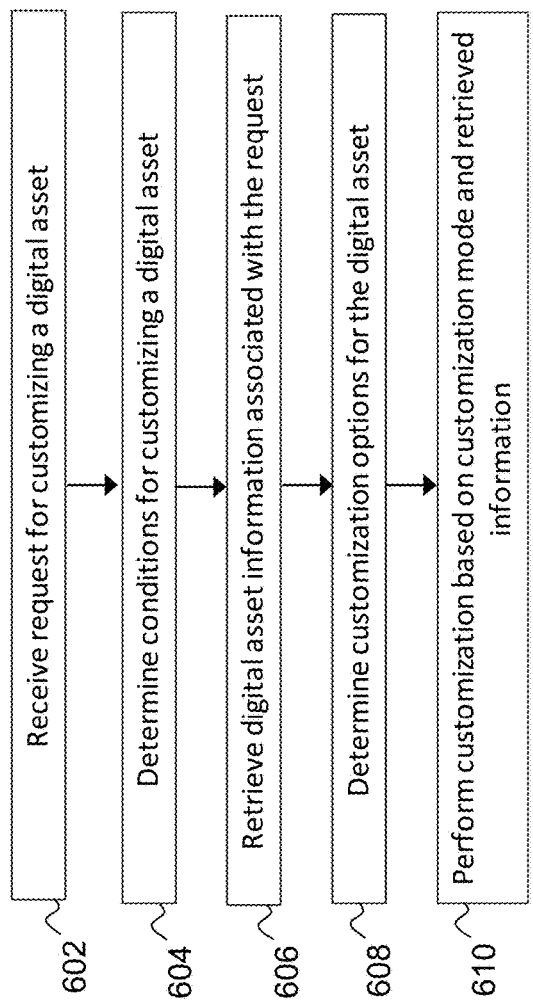
FIG. 6 is a flowchart illustrating a process for customizing digital assets, according to some embodiments.

Exemplary Additional Methods for Processing Digital Assets and Physical Products FIG. 6 is a flowchart illustrating a method 600 for customizing digital assets. As a non-limiting example with regards to FIGS. 1 and 2A-B, one or more processes described with respect to FIG. 6 may be performed by a user device (e.g., user devices 240A-D of FIG. 2), a digital activation layer (e.g., digital activation layer 230A of FIG. 2), or a backend layer (e.g., backend layer 210 of FIG. 2). In such an embodiment, any of these components may execute code in memory to perform certain steps of method 600 of FIG. 6. While method 600 of FIG. 6 will be discussed below as being performed by digital activation layer 230A and user devices 240A-D, other devices may store the code and therefore may execute method 600 by directly executing the code. Accordingly, the following discussion of method 600 will refer to devices of FIG. 2 as an exemplary non-limiting embodiment of method 600. Moreover, it is to be appreciated that not all steps may be needed to perform the disclosure provided herein. Further, some of the steps may be performed simultaneously or in a different order than shown in FIG. 6, as will be understood by a person of ordinary skill in the art.

In 602, the digital activation layer 230A may receive a request for customizing a digital asset from a user device such as user devices 240A-D. The customization request may include authentication information to verify the user identity, the user's account information in the digital asset system, digital asset information, and customization preferences. In an embodiment, the request is received through a downloaded application on the user device that provides a graphical user interface for interacting with a visualization of the digital asset that may allow, for example, selecting the different customization options that can be included in the customization request. In an embodiment, the request may also be for generating a new digital asset. In another embodiment, the request can be for remixing components of existing digital assets to create a new digital asset. In this embodiment, the request includes or otherwise identifies the components from the existing digital assets to be used for customizing the digital asset.

In 604, the digital activation layer 230A may analyze the customization request to determine conditions for customizing the digital asset. In an embodiment, conditions may be a cost may be in form of the digital currency or actual currency. Other conditions may include any requirements imposed by a smart contract on the distributed ledger 231A associated with the digital asset. In embodiments where the digital asset is being generated by remixing existing digital assets, a separate smart contract that specifies a customization methodology can be utilized for determine any conditions for combining components. For example, certain components may not be compatible (e.g., a sandal may be not compatible with an eyelet component). In an embodiment, conditions may be linked to the user requesting the customization which indicate whether the user has permission or is otherwise allowed to perform the customization.

In 606, if the conditions for customizing the digital asset are met, the digital activation layer 230A may retrieve digital asset information associated with the information provided in the request such as information required to generate or customize the digital asset. In an embodiment where the digital asset is to be generated based on existing digital assets, the customization request may include information of the digital assets and their associated components that form the basis of the customization.

In 608, the digital activation layer 230A may determine a customization mode and associated options. A customization mode may indicate how the digital asset is to be generated (e.g., from components of existing digital assets, how components are to be combined). Examples of customization modes include machine learning, random, popularity, and user selection. Machine learning customization mode is based on a machine learning model that selects and matches components based on historical information (e.g., sales information) associated with physical products that included the same or similar physical components corresponding to the digital components as well as other information and metrics associated with digital assets. Random customization mode selects and matches components in a random manner without regard for any other information or metrics. Popularity customization mode selects and matches components based on user activity (e.g., votes, social media posts) associated with the digital assets and their components. User selection mode provides a user full control over the specific components and combination that results in the generation of the digital asset. In some embodiments, the user selection mode may also transfer the user control of the digital asset into the generation of a corresponding physical product, e.g., through communication with production subsystem 212.

In an embodiment, the digital activation layer 230A may select a mode based on the default setting of the digital asset system or past selected remixing modes if the user preference is not available. In an embodiment, the digital activation layer 230A may also combine multiple customization modes. For example, the digital activation layer 230A may generate a certain percentage of the digital asset in the random mode and another percentage of the digital asset in the popularity mode. The digital activation layer 230A may decide the portions for each mode based on the remixing request or random algorithms or based on conditions imposed by the distributed ledger 231A such as through an associated smart contract.

In 610, the digital activation layer 230A may perform the customization of the digital asset based on the determined customization mode (208) and the retrieved information of the associated digital components (206). The digital activation layer 230A may combine the digital components in a manner specified by the customization mode. In an embodiment, the digital activation layer 230A uses specific templates for digital assets onto which the digital components are implemented to form a digital asset. As a non-limiting example, when digital assets are implemented as digital shoes, the digital activation layer 230A may retrieve certain templates corresponding to specific styles such as sneaker, boots, sandals. Templates may include placeholder locations onto which the digital components can be placed. For example, a template for a sneaker may include a placeholder location for eyelets, the tongue, the sole, specific designs, colors, and features. Retrieved component information may then be incorporated into these placeholder locations based on the customization mode. In a user selection mode, the user may select the template and manually select which component corresponds to each placeholder location. In other modes, the template may be selected by the digital activation layer 230A based on the information provided in the customization request and on the customization mode.

Figure 7:
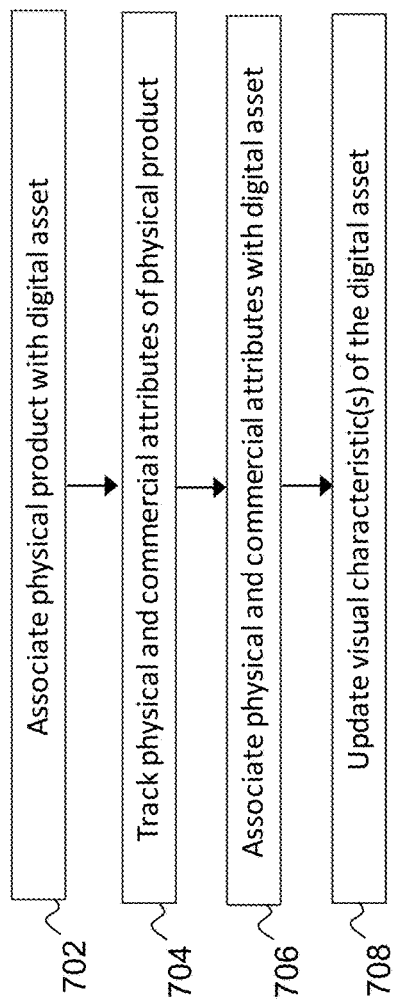
FIG. 7 is a flowchart illustrating a process for generating a reward associated with digital assets, according to some embodiments.

FIG. 7 is a flowchart illustrating a method 700 to provide a reward to the user of the digital asset system. As a non-limiting example with regards to FIGS. 1 and 2A-B, one or more processes described with respect to FIG. 7 may be performed by a user device (e.g., user devices 240A-D of FIG. 2), a digital activation layer (e.g., digital activation layer 230A of FIG. 2), or a backend layer (e.g., backend layer 210 of FIG. 2). In such an embodiment, any of these components may execute code in memory to perform certain steps of method 700 of FIG. 7. While method 700 of FIG. 7 will be discussed below as being performed by digital activation layer 230A and user devices 240A-D, other devices may store the code and therefore may execute method 700 by directly executing the code. Accordingly, the following discussion of method 700 will refer to devices of FIG. 2 as an exemplary non-limiting embodiment of method 700. Moreover, it is to be appreciated that not all steps may be needed to perform the disclosure provided herein. Further, some of the steps may be performed simultaneously or in a different order than shown in FIG. 7, as will be understood by a person of ordinary skill in the art.

In 702, the digital activation layer 230A receives a request to associate a physical product, such as physical product 116 with the digital asset, such as digital asset 120. As one non-limiting example, the physical product 116 may be purchased from a physical store and may be equipped with a means for digitally identifying the physical product through a wireless protocol RFID, NFC, Bluetooth or WiFi, or via scanning of a QR code or other identifier imprinted on the physical product 116. The request may be received from a user device and may include a user ID and an identification of the physical product to be associated with a digital asset. In an embodiment, upon receiving the request, the digital activation layer 230A can validate the identity of the user and ownership of the physical product 116 based on information provided in the request. In an embodiment, the request may include additional information that can be used to confirm the purchase of the physical product, identity of the user, or other user activity such as location information of physical product 116 and location and the user of the user device.

In 704, an application on the user device may be used to tracking usage of the physical product 116 after it has been linked with a digital asset 120 by the digital activation layer 230A. Usage activity may include social media activity where the user posts images or texts about the physical product 116, video game activity where the digital asset 120 been utilized in a video game, and physical activity information taken with the physical product 116 such as number of steps that the user device tracked for physical product 116, number of calories burned, distance walked, distance ran, and jumping. Tracking of usage activity can be performed via the application on user device where the application activates sensors such as an accelerometer and heart rate monitor that may be implemented on a wearable device connected to the user device.

In 706, the digital activation layer 230A may associate the tracked usage information of the physical product with the digital asset. The distributed ledger 231A may associate the tracked usage information on a block in the blockchain network and can include updating information located in the block to include the tracked usage information. In some embodiments, the tracked usage information may be linked to other corresponding physical products associated with the physical product. For example, if the physical product is a particular shoe endorsed by a particular celebrity such as a soccer player, the tracked usage information may be based on actual activity of the soccer player using the physical product during his match. In this instance, a user device (e.g., user device 240A-D) may be associated with the physical product of the celebrity which provides the tracked usage information to digital activation layer 230A for use in updating all digital assets associated with that physical product.

In 708, the digital activation layer 230A may update the digital asset based on the tracked usage information. In an embodiment, updating the digital asset means updating the appearance of the digital asset or updating a digital currency associated with the digital asset. In a non-limiting example, digital currency may be awarded based on certain milestones associated in the tracked usage information such as reaching a certain number of steps or visiting certain physical locations such as certain stores.

Figure 8:
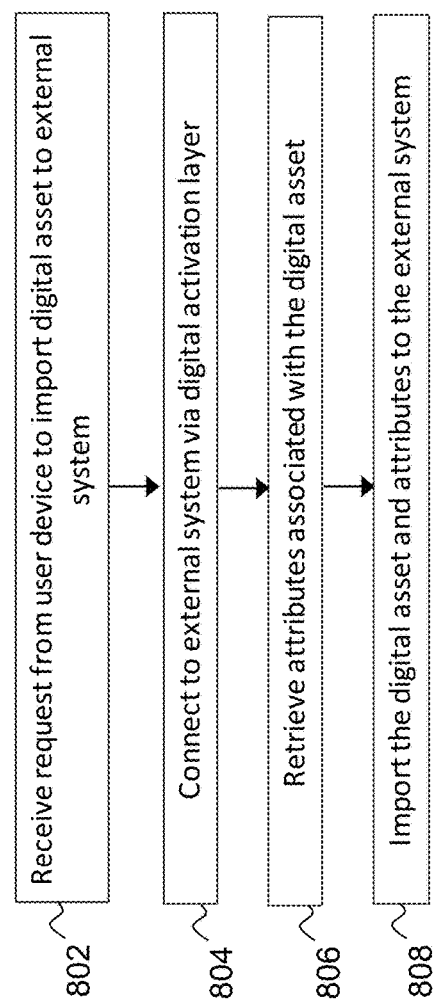
FIG. 8 is a flowchart illustrating a process to integrate digital assets into a third party system, according to some embodiments.

FIG. 8 is a flowchart illustrating a method 800 to import a digital asset to a third-party application such as one provided via external systems 220. As a non-limiting example with regards to FIGS. 1 and 2A-B, one or more processes described with respect to FIG. 8 may be performed by a user device (e.g., user devices 240A-D of FIG. 2), a digital activation layer (e.g., digital activation layer 230A of FIG. 2), or a backend layer (e.g., backend layer 210 of FIG. 2). In such an embodiment, any of these components may execute code in memory to perform certain steps of method 800 of FIG. 8. While method 800 of FIG. 8 will be discussed below as being performed by digital activation layer 230A and user devices 240A-D, other devices may store the code and therefore may execute method 800 by directly executing the code. Accordingly, the following discussion of method 800 will refer to devices of FIG. 2 as an exemplary non-limiting embodiment of method 800. Moreover, it is to be appreciated that not all steps may be needed to perform the disclosure provided herein. Further, some of the steps may be performed simultaneously or in a different order than shown in FIG. 8, as will be understood by a person of ordinary skill in the art.

In 802, the digital activation layer 230A may receive a request from a user device, such as user devices 240A-D to import a digital asset into a third-party application such as one provided by external systems 220. The third-party application may be a video game or a social media application.

In 804, the digital activation layer 230A may connect to the external systems 220 hosting the third-party application such as gamification component 222 or social media component 224. The digital activation layer 230A may determine whether the user is authorized to import the digital asset into the application. For example, there may be certain conditions imposed by the digital activation layer 230A or a smart contract on the blockchain network associated with the digital asset. In an embodiment, in this step, the digital activation layer 230A can pull a user profile associated with the user or the associated smart contract may perform this check automatically. Either method may include identifying the conditions for whether the user can import the digital asset and other details associated with how the digital asset is to be imported into different applications.

In 806, the digital activation layer 230A may analyze the digital asset to retrieve characteristics of the digital asset and may determine how the digital asset is to be imported into the third-party applications. The characteristics of the digital asset can dictate how the digital asset is imported into each application. For example, a digital shoe imported into a sports video game can result in a player that runs faster such as by changing the attributes of the video game character or may simply alter the appearance of the video game character. As another example, a digital shirt imported into a social media application can result in digital alterations of a user within images in the social media application. As another example, importing the digital asset into a sports or action video game could result into a faster player based on characteristics of the digital asset such as whether the digital asset corresponds to a sneaker or a cross-training shoe.

In 808, the digital activation layer 230A may import the digital asset and/or its characteristics to the external systems 220 which may then personalize the application based on the provided information. For example, the digital activation layer 230A may send the characteristics of the digital asset to application servers for importation into the application.

Figure 9:
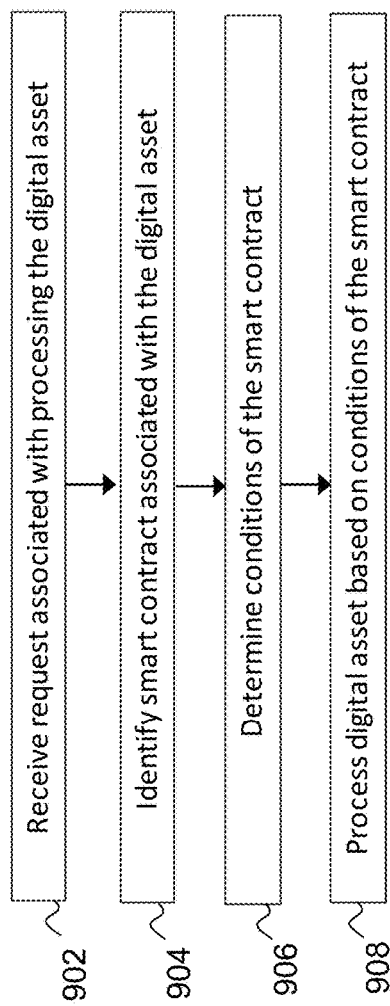
FIG. 9 is a flowchart illustrating a process to process a digital asset based on a smart contract for implementing blockchain technology, according to some embodiments.

FIG. 9 is a flowchart illustrating a method 900 to process a digital asset based on a smart contract for implementing blockchain technology. As a non-limiting example with regards to FIGS. 1 and 2A-B, one or more processes described with respect to FIG. 9 may be performed by a user device (e.g., user devices 240A-D of FIG. 2), a digital activation layer (e.g., digital activation layer 230A of FIG. 2), or a backend layer (e.g., backend layer 210 of FIG. 2). In such an embodiment, any of these components may execute code in memory to perform certain steps of method 900 of FIG. 9. While method 900 of FIG. 9 will be discussed below as being performed by digital activation layer 230A and user devices 240A-D, other devices may store the code and therefore may execute method 900 by directly executing the code. Accordingly, the following discussion of method 900 will refer to devices of FIG. 2 as an exemplary non-limiting embodiment of method 900. Moreover, it is to be appreciated that not all steps may be needed to perform the disclosure provided herein. Further, some of the steps may be performed simultaneously or in a different order than shown in FIG. 9, as will be understood by a person of ordinary skill in the art.

In 902, the digital activation layer 230A may receive a request for processing a digital asset. Examples of processing the digital asset include generating a new digital asset, customizing the digital asset based on new components, updating the digital asset based on conditions such as user activity or user milestones, importing the digital asset into another application.

In 904, the digital activation layer 230A may retrieve a smart contract associated with the digital asset where the smart contract includes information and conditions associated with the digital asset. Information can include components of the digital asset and characteristics of the digital asset. Conditions can specify actions that can be performed by on the digital asset and milestones associated with the digital asset. The conditions may be triggered based on information in the user request.

One condition may be generating a physical product associated with the digital asset. In some embodiments, the enterprise may allow its customers to have direct access to control the production subsystem 212. Direct access may mean that a customer request may be allowed to include specific design details regarding a custom physical product and the smart contract would enable those specific design details to be forwarded to the production subsystem 212 where the physical product may be manufactured in accordance with the customer request. Once manufactured by production subsystem 212, the digital activation layer 230A may cause the shipping subsystem 214 to ship the custom physical product directly to the customer (i.e., bypassing a physical store). In some embodiments, the manufactured physical product may be a different style of product than the digital asset. For example, the digital asset may be a shoe but the digital activation layer 230A may enable access to different services (e.g., based on the membership status of the customer) such as the option to manufacture different styles of products such as shirt, pants, or a backpack.

In some embodiments, the enterprise may store different smart contracts on the blockchain related to direct access where each smart contract may be triggered based on conditions associated with the customer request and the customer. For example, the enterprise may generate separate smart contracts for customers in different geographical regions to account for capabilities of different production subsystems in those geographical regions. As another example, the enterprise may generate separate smart contracts for each physical product (e.g., footwear, apparel) and the specific smart contract may be triggered based on the information in the customer's request.

Other examples of conditions include customizing the digital asset and transferring the digital asset for use in external systems 220. Customizing the digital asset may include allowing the user to add personal details such as with the user's name, updating the appearance of the digital asset based on real-world usage of a corresponding physical product, and on a user's online activities such as social media postings involving the digital asset. Transferring the digital asset for use with, for example, gamification component 222, may include allowing the digital asset to be digitally represented in video games on a user's device.

In 906, the digital activation layer 230A may determine the conditions of the smart contract that are triggered by the customer request such as the examples discussed above including direct access to production subsystem 212, customization of the digital asset, and transferring for use in external systems 220.

In 908, the digital activation layer 230A may then process the digital asset based on the conditions of the smart contract and based on the user request. For example, if the request is to customize a physical product associated with the digital asset, the digital activation layer 230A may transfer the request with the details of the customization to backend layer 210 where production subsystem 212 may produce the physical product in accordance with the customization details. As another example, if the request is to transfer the digital asset to a video game, the digital activation layer 230A may transfer the digital asset to external systems. The digital activation layer 230A may require external systems to be implemented as a sidechain, off of the main blockchain, in order to maintain control of the digital asset. Implemented as a sidechain, the external systems are securely connected to digital activation layer 230A which allows the digital activation layer 230A to securely transfer the digital asset to, for example, gamification component 222 or social media component 224, and implement restrictions on how the digital asset is used.

Exemplary Digital Asset

FIGS. 10A-C are views of an exemplary interactive visualization 1000 of a digital asset. The interactive visualization 1000 may be implemented with certain visual characteristics that provide access to information associated with the digital asset. Interactive visualization 1000 is merely one possible embodiment of a digital asset and is not intended to be limiting of the physical representation or visual characteristics that may be utilized when implementing a digital asset. Other visualizations and implementations of a digital asset are possible consistent with the description of the digital asset provided herein.

In this embodiment, interactive visualization 1000 of a digital asset may include visual characteristics for displaying corresponding physical product, associated advertisement campaigns, multimedia showing the corresponding physical product, a user-related data associated with an owner, and commercial attributes associated with the corresponding physical product (or related physical products). That is, different visual characteristics of the interactive visualization 1000 may correspond to different information associated with the digital asset such as the corresponding physical product, metrics associated with the physical product, metrics associated with the digital asset, ownership information of the digital asset, and ownership information of the physical product. The interactive visualization 1000 may be manipulated (e.g., turned, rotated, flipped) to access different visual characteristics which may be selectable (e.g., provide access to a link). When selected, the visual characteristics may provide information associated with the selected visual characteristic.

FIG. 10A depicts interactive visualization 1000 that includes an image 1010 of a corresponding physical product, related external system information 1020 associated with the corresponding physical product, and related media 1030 associated with the corresponding physical product. The interactive visualization 1000 may be displayed on a user device, such as when a user requests access or to review a digital asset and may be manipulated by the user device to access different features of the interactive visualization 1000. For example, selection of the image 1010 of the physical product may retrieve and display additional information about the physical product on the interactive visualization 1000. Selection of related external system information 1020 may retrieve media information from external systems 220 such as from video game information in which the digital asset has been used or social media information in which the digital asset and the physical product have been mentioned or posted. Related media 1030 may be any videos, audio, or images associated with the physical product or digital asset that are provided by the enterprise network 205 (e.g., such as an advertising campaign).

FIG. 10B shows another view of interactive visualization 1000 that includes secure information 1040 associated with the digital asset. This view may be provided via rotation of the interactive visualization 1000. In this view, secure information 1040 may include any information that is encrypted or that requires additional authentication to access. Examples of secure information 1040 include ownership of the digital asset (e.g., all the previous owners of the digital asset) and a history of transactions of the digital asset within enterprise network 205.

FIG. 10C shows another view of interactive visualization 1000 that includes metrics 1050 of the digital asset and the physical product. This view may be provided via rotation of the interactive visualization 1000. In this view, metrics 1050 may provide information collected by the distributed ledger 231A such as the commercial attributes of the physical product and transaction history of the digital asset such as with external systems 220.

FIGS. 10A-C depict digital asset 1000 as corresponding to a physical product. In such implementations, all digital assets owned by a user may be linked in a sidechain off the main blockchain which will allow all of a user's digital assets to be easily processed and accessed by the digital activation layer.

Exemplary Computer System

Figure 11:
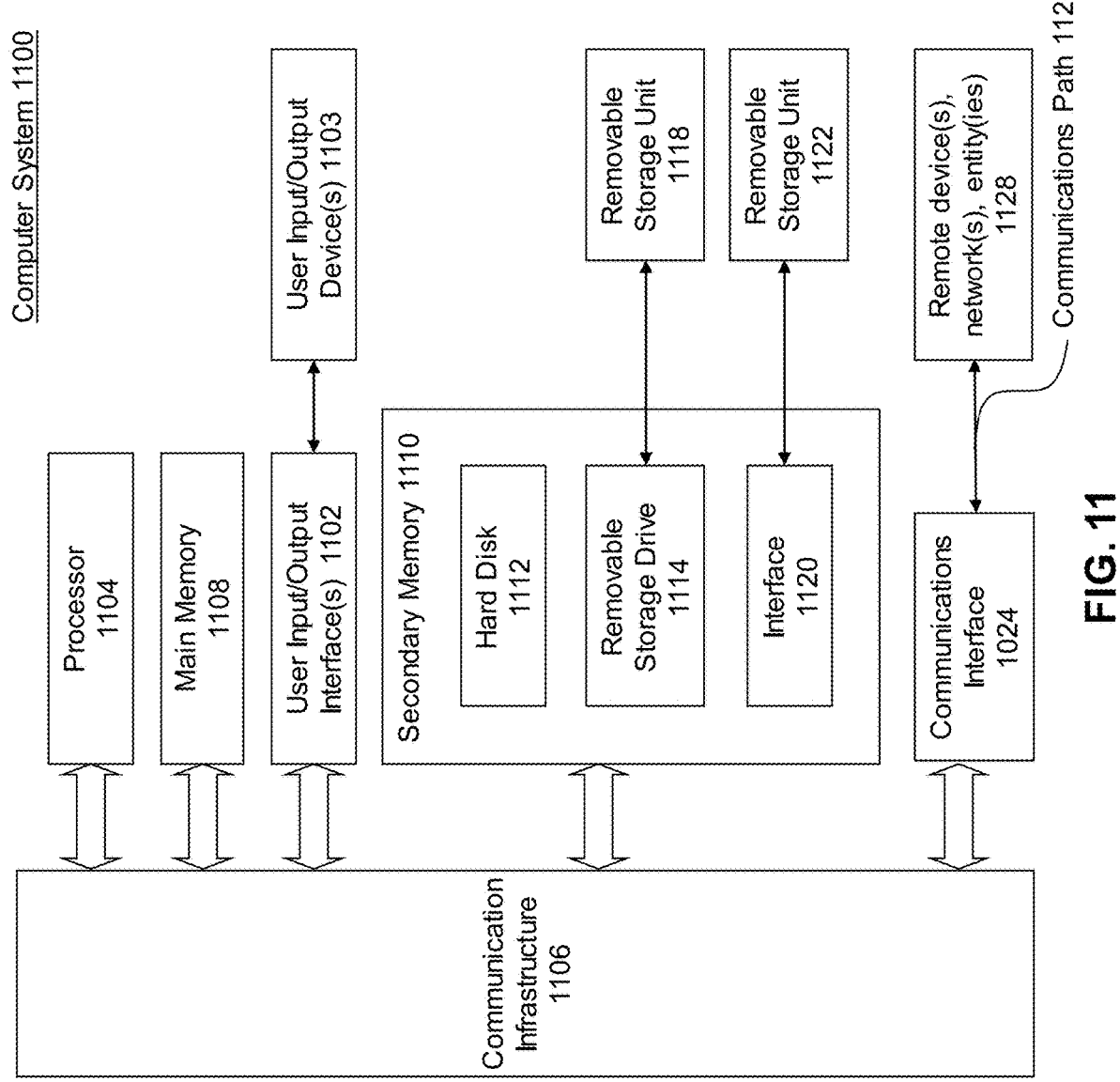
FIG. 11 is an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In an embodiment, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for securely distributing a plurality of digital assets via a digital activation layer implemented within an enterprise network, the method comprising:

receiving, from a user device, a request to register with the enterprise network;

activating, on a node of a distributed node system managed by the digital activation layer, a digital storage component associated with the user device in response to receiving the request;

generating, by the digital activation layer, the plurality of digital assets as part of a digital asset drop;

depositing, by the digital activation layer, a digital asset of the plurality of digital assets into the digital storage component, wherein the digital asset is associated with a physical product;

determining that a manufacturing condition associated with the digital asset is satisfied;

permitting the user device access to a backend system to manufacture the physical product based on the determining;

receiving, from the user device, an action to be performed on the digital asset based on the permitting;

performing, by the digital activation layer, the action on the digital asset, wherein the action is a request to initiate a second action associated with the physical product, wherein the second action is configured to trigger a backend system to manufacture the physical product;

converting the digital asset into a visualization that is compatible for integration with a third-party application; and importing the visualization into the third-party application, wherein the visualization is configured to adjust a digital appearance within the third-party application.

2. The method of claim 1, wherein the backend system is in communication with the digital activation layer.

3. The method of claim 1, wherein the digital activation layer is configured to establish a connection with an external system located outside of the enterprise network.

4. The method of claim 3, wherein the external system is configured to implement a third-party application, the method further comprising:

importing, via the connection, the digital asset to the external system for use by the third-party application.

5. The method of claim 4, wherein the third-party application is a video game application.

6. The method of claim 4, wherein the third-party application is a social media application.

7. The method of claim 3, wherein the digital activation layer is implemented as a blockchain network and the connection with the external system is implemented as a sidechain network off of the blockchain network.

8. The method of claim 7, wherein the digital activation layer is configured to import the digital asset to the external system via the sidechain network.

9. The method of claim 1, wherein generating the plurality of digital assets as part of the digital asset drop further comprises:

retrieving a usage metric associated with the physical product, wherein the usage metric indicates at least one of a popularity of the physical product or a sales figure of the physical product; and generating the digital asset based on the usage metric.

10. The method of claim 1, wherein the digital asset is a non-fungible token that is generated based on at least one physical attribute of the physical product.

11. The method of claim 1, wherein the second action associated with the physical product further comprises initiating, by a production subsystem in the backend system, a production sequence for manufacturing the physical product.

12. A system for securely distributing a plurality of digital assets, the system comprising:
a digital activation layer implemented within an enterprise network, wherein the digital activation layer is configured to:
receive, from a user device, a request to register with the enterprise network;
activate, on a node of a distributed node system managed by the digital activation layer, a digital storage component associated with the user device in response to receiving the request;
generate the plurality of digital assets as part of a digital asset drop;
deposit a digital asset of the plurality of digital assets into the digital storage component, wherein the digital asset of the plurality of digital assets is associated with a physical product;
determine that a manufacturing condition associated with the digital asset is satisfied;
permit the user device access to a backend system to manufacture the physical product based on the determining;
receive, from the user device, an action to be performed on the digital asset based on the permitting;
perform the action on the digital asset, wherein the action is a request to initiate a second action associated with the physical product, wherein the second action is configured to trigger a backend system to manufacture the physical product;
convert the digital asset into a visualization that is compatible with a third-party application;
import the visualization into the third-party application, wherein the visualization is configured to adjust a digital appearance within the third-party application; and
prevent, subsequent to triggering the backend system to manufacture the physical product, any additional actions to be performed on the digital asset by digitally destroying the digital asset.

13. The system of claim 12, wherein the backend system is in communication with the digital activation layer.

14. The system of claim 12, wherein the digital activation layer is configured to establish a connection with an external system located outside of the enterprise network.

15. The system of claim 14, wherein the external system is configured to implement a third-party application, the digital activation layer further configured to:
import, via the connection, the digital asset to the external system for use by the third-party application.

16. The system of claim 15, wherein the third-party application is a video game application.

17. The system of claim 15, wherein the third-party application is a social media application.

18. The system of claim 14, wherein the digital activation layer is implemented as a blockchain network and the connection with the external system is implemented as a sidechain network off of the blockchain network.

19. The system of claim 12, wherein to generate the plurality of digital assets as part of the digital asset drop, the digital activation layer is further configured to:
retrieve a usage metric associated with the physical product, wherein the usage metric indicates at least one of a popularity of the physical product or a sales figure of the physical product; and
generate the digital asset based on the usage metric.

20. A non-transitory computer-readable medium with program code stored thereon, wherein the program code is executable to cause a digital activation layer implemented within an enterprise network to perform operations comprising:
receiving, from a user device, a request to register with the enterprise network;
activating, on a node of a distributed node system managed by the digital activation layer, a digital storage component associated with the user device in response to receiving the request;
generating a plurality of digital assets as part of a digital asset drop;
depositing a digital asset of the plurality of digital assets into the digital storage component, wherein the digital asset is associated with a physical product;
determining that a manufacturing condition associated with the digital asset is satisfied;
permitting the user device access to a backend system to manufacture the physical product based on the determining;
receiving, from the user device, an action to be performed on the digital asset based on the permitting;
performing the action on the digital asset, wherein the action is a request to initiate a second action associated with the physical product, wherein the second action is configured to trigger a backend system to manufacture the physical product;
converting the digital asset into a visualization that is compatible with a third-party application;
importing the visualization into the third-party application, wherein the visualization is configured to adjust a digital appearance within the third-party application; and
preventing, subsequent to triggering the backend system to manufacture the physical product, any additional actions to be performed on the digital asset by digitally destroying the digital asset.

* * * * *